(12) United States Patent
Yamamoto

(10) Patent No.: US 7,317,058 B2
(45) Date of Patent: Jan. 8, 2008

(54) (METH)ACRYLATE POLYMER AND NON-LINEAR OPTICAL DEVICE MATERIAL COMPOSITION

(75) Inventor: Michiharu Yamamoto, Carlsbad, CA (US)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/255,735

(22) Filed: Oct. 21, 2005

(65) Prior Publication Data

US 2006/0094845 A1    May 4, 2006

Related U.S. Application Data

(60) Provisional application No. 60/624,040, filed on Nov. 1, 2004.

(51) Int. Cl.
C08F 12/20      (2006.01)
C08F 118/02     (2006.01)

(52) U.S. Cl. ............. 526/242; 526/319; 526/257; 526/259; 525/326.7; 525/328.2

(58) Field of Classification Search .......... 525/326.7, 525/328.2; 526/257, 259, 242, 319
See application file for complete search history.

(56) References Cited

U.S. PATENT DOCUMENTS

| | | | |
|---|---|---|---|
| 2,774,697 A | 12/1956 | Koblitz | |
| 5,064,264 A * | 11/1991 | Ducharme et al. ......... | 385/130 |
| 5,426,164 A | 6/1995 | Babb et al. | |
| 5,763,548 A | 6/1998 | Matyjaszewski et al. | |
| 5,807,937 A | 9/1998 | Matyjaszewski et al. | |
| 6,067,186 A * | 5/2000 | Dalton et al. .............. | 359/321 |
| 6,090,332 A | 7/2000 | Marder et al. | |
| 6,267,913 B1 * | 7/2001 | Marder et al. .............. | 252/582 |
| 6,348,992 B1 * | 2/2002 | Zhang et al. ............... | 359/321 |
| 6,361,717 B1 * | 3/2002 | Dalton et al. .............. | 252/582 |
| 6,534,198 B1 | 3/2003 | Ueno et al. | |
| 6,555,027 B2 * | 4/2003 | Wang et al. ................ | 252/582 |
| 6,610,809 B1 | 8/2003 | Yamamoto | |
| 6,616,865 B1 * | 9/2003 | Zhang et al. ............... | 252/582 |
| 6,653,421 B1 * | 11/2003 | Yamamoto et al. ........ | 526/259 |
| 6,716,995 B2 | 4/2004 | Huang et al. | |
| 2002/0027220 A1 * | 3/2002 | Wang et al. ................ | 252/582 |
| 2002/0084446 A1 * | 7/2002 | Dalton et al. .............. | 252/582 |
| 2004/0266954 A1 * | 12/2004 | Jen et al. ................... | 525/326.1 |

FOREIGN PATENT DOCUMENTS

| | | | |
|---|---|---|---|
| JP | 01266118 A | * | 10/1989 |
| JP | 10-333195 | | 12/1998 |
| JP | 2001-115124 | | 4/2001 |
| JP | 07-318992 | | 12/2005 |
| WO | WO 01/53746 | | 7/2001 |

OTHER PUBLICATIONS

Ando, Tsuyoshi et al., "Living Radical Polymerization of Methyl Methacrylate with Ruthenium Complex: Formation of Polymers with Controlled Molecular Weights and Very Narrow Distributions," Macromolecules, 29:1070-1072 (1996).

Diaz-Garcia, M.A. et al., Photorefractive Properties of Poly(N-vinyl carbazole)-Based Composites for High-Speed Applications, Chem. Mater., vol. 11, No. 7: 1784-1791 (1999).

Hendrickx, Eric et al., "Photoconductive properties of PVK-based photorefractive polymer composites doped with fluorinated styrene chromophores," J. Mater. Chem., 9:2251-2258 (1999).

In Kyu Moon et al., "Highly Efficient Photoretractive System Based on Carbazole-Substituted Poly (Siloxane)," Mol. Cryst. Liq. Cryst., 349:43-46 (2000).

Kawakami, T. et al., "Photoinduced refractive index change in a photoconductive electro-optic polymer," Appl. Phys. Lett., 62 (18), May 3, 1993, pp. 2167-2169.

Matyjasewski, K. et al., "Controlled/living radical polymerization. Halogen atom transfer radical polymerization promoted by a Cu(I)/Cu(II) redox process", Macromolecules, 28, 7901 (1995).

Meerholz, K. et al., "A photorefractive polymer with high optical gain and diffraction efficiency near 100%," Nature, 371:497-500 (1994).

Patten, Timothy E. et al., "Radical Polymerization yielding Polymers with $M_w M_n \sim 1.05$ by Homogeneous Atom Transfer Radical Polymerization," Polymer Preprints, 37:575-576 (1996).

Peng Zhou et al., "Synthesis of $C_{60}$-End-Bonded Polymers with Designated Molecular Weights and narrow Molecular Weight Distributions via Atom Transfer Radical Polymerization," Macromolecules, 2000, 33, 1948-1954, 2000 American Chemical Soceity Published on web Feb. 25, 2000.

Sato, Hisaya et al., Synthesis and Characterization of Photorefractive Polymeric Material with High Change Mobility, Technical Report of IEICB (10005-10), pp. 43-45.

Ueda, Jiro et al., "Multifunctional Initiators for the Ruthenium-Mediated Living Radical Polymerization of Methyl Methacrylate: Di-and Trifunctional Dichloroacetates for Synthesis for Multiarmed Polymers," Macromolecules, vol. 31, No. 3, 557-562 (1998).

Tamura, K. et al., "New polymerix material containing the tricyanovinylcarbazole group for photorefractive applications," Appl. Phys. Lett., 60(15), Apr. 13, 1992, pp. 1803-1805.

Twleg, R. et al., "Recent Progress on Photorefractive Chromophores and Polymers," IMB Research Division Almaden Research Laboratory, San Jose, CA 95120, pp. 164-165.

(Continued)

Primary Examiner—Randy Gulakowski
Assistant Examiner—M. Bernshteyn
(74) Attorney, Agent, or Firm—Knobbe Martens Olson & Bear LLP.

(57) ABSTRACT

A non-linear optical device composition includes a trifluorovinyl group containing poly(meth)acrylate that is crosslinkable and thermally stable after crosslinking. The poly(meth)acrylate composition may provide passive or active wave-guide optical capabilities. The composition may be used for an active wave guide material, such as modulator or switching device compositions. Furthermore, the composition may include a trifluorovinyl containing chromophore and poly(meth)acrylate which provides non-linear optical ability in the matrix polymer system.

16 Claims, 2 Drawing Sheets

OTHER PUBLICATIONS

Van Steenwinckel, David et al., Fully Functionalized Photorefractive Polymethacrylates with net Gain at 780 nm, *Macromolecules*, 33:4074-4079 (2000).

Wang, Jin-Shan et al., "Controlled/'Living' Radical Polymerization. Halogen Atom Transfer Radical Polymerization Promoted by a Cu(I)/Cu(II) Redox Process," *Macromolecules*, vol. 28, No. 23, 1995, pp. 7901-7910.

Woong Sang Jahng et al., "Synthesis and Characterization of Hole=transport Materials in Polysiloxane," Molecular Crystals and Liquid Crystals Gordon & Breach Switzerland, 377:329-332 (2002), XP008039101, ISSN: 1058-725X.

Wright, Daniel et al., "Photorefractive Properties of Poly (siloxane)-Triarylamine-based Composites for High-Speed Applications," *J. Phys. Chem. B.*, vol. 107, No. 20, 4732-4737 (2003), XP002306198.

Yamamoto, M. et al., "The Preparation and Thermal Dimerization Study of a Trifluorovinyl-containing Imide, Application to the Synthesis of a Trifluorovinyl-Containing Polyimide Precursor," *Macromol. Symp.* 82:125-141 (1994).

Yi-Wang Chen et al., "Photorefractive Effect in a New Composite Based on Bifunctional Host Polymer," *Journal of Applied Polymer Science*, 77:189-194 (2000).

* cited by examiner

(METH)ACRYLATE POLYMER AND NON-LINEAR OPTICAL DEVICE MATERIAL COMPOSITION

CROSS-REFERENCE TO RELATED

This application claims the benefit of U.S. Provisional Application No. 60/624,040, filed Nov. 1, 2004, the disclosure of which is incorporated herein by reference in its entirety.

BACKGROUND OF THE INVENTION

1. Field of the Invention

The invention relates to passive and active optical device materials. More particularly, the invention relates to a crosslinkable (meth)acrylate polymer composition which provides either passive or active wave-guide optical capabilities.

2. Description of the Related Art

Passive and active wave-guide optical device materials are key components for a wide range of cutting edge optical telecommunication devices. Also, signal processing by optical technology in broadband society will be a key issue to control large amounts of information accurately with fast response time. Particularly, there is a growing interest to use active nonlinear optical devices for signal modulation and switching. Also, passive optical wave-guide device materials are crucial components in order to lead optical signals into the active nonlinear optical devices. Organic active non-linear optics materials have several advantages, i.e. large NLO effect, nano- to pico-second response time, and structural design flexibility. Also, these polymer-based materials showed better processing ability, mechanical stableness, and cost effective compared to inorganic crystal material, such $LiNbO_3$ and $BaTiO_3$. Also, in term of response time and modulation speed, polymer-based materials have advantages than inorganic materials, because usually organic polymer-based materials have lower dielectric constant that leads to faster modulation and switching properties. Also, a passive material is a fundamental material for active optical devices, because this material can be used for the device portion in which optical signals can travel between devices and optical fibers.

It is desirable for polymer-based optical device material to have high stability (thermal, chemical, photochemical, and mechanical) and low optical loss along with high electro-optic performances.

For achieving high thermal stabilities, high Tg polymers matrix systems are desirable, such as polyimide, polyurethane, and polyamide. However, even in case of lower Tg polymer matrix system, such as poly(meth)acrylate, polystyrene, or polyolefine, crosslinking of the polymer matrix can improve and raise the Tg of the matrix polymer, which leads to higher thermal stabilities. Particularly, polyimides show excellent thermal stability and used for various engineering plastics materials. Since poly(meth)acrylate is very stable in chemical, mechanical and temperature properties and possesses excellent optical properties, its major interesting properties for passive or active optical devices include:

Chemical Stabilities

It is compatible with most microelectronics processes including photolithographic, Ion Reactive Etching (RIE), plasma and sputtering depositions, etc. It has reasonable solvent solubility therefore, it can be easily coated as thin film using variety of techniques (spin or spray coatings) before crosslinking.

Physical and Thermal Stabilities

Poly(meth)acrylate has a thermal expansion coefficient compatible with silicon, which will be very useful property for integration polymer optical devices with silicon based microelectronic devices. It is also chemically stable at temperature as high as 300° C.

Optical Properties

Poly(meth)acrylate has high optical transmission over a wide range from visible to telecommunication wavelengths. In optical wave-guide shape, the transmission loss is reported as lower as 0.1 dB/cm at 1.3 µm.

ElectroOptics Properties

When poly(meth)acrylate is loaded with chromophore, it becomes nonlinear poly(meth)acrylate material, and it could have relatively high nonlinearity.

Furthermore, particularly fluorinated polymers have unique features, such as low dielectric constants, low optical loss, and easier workability because of good solvent solubility. Usually, fluorinated Poly(meth)acrylate before crosslinking has very good solvent solubility so it is easily workable for spin-coating processing in fabrication of optical devices.

Also, dielectric constants are generally known the lower, as the more fluorine atom weight content ratio increased. Usually, the lower dielectric constant material can make optical signal traveling speed or modulation speed faster because of less π-electron interaction.

Generally, fluorinated polymer can reduce optical loss of signals. Optical propagation loss includes absorption and scattering losses. Material properties, namely interband electronic absorption of the chromophore and C—H vibration absorption of chromophore and polymer host, contribute to the absorption loss in the polymers. The scattering loss is mainly attributed to dust particles and micro domains introduced during the processing (spin coating, poling, photolithographic processing, and etc.). Therefore, advantages of the fluorinated polymer can mainly contribute to lower the absorption losses. Usually, the wavelengths which are generally used in the telecommunication are between 1.3 and 1.5 µm. Thus, if polymer-based materials contain significant amounts of C—H bonds, $NH_2$, NH, or OH functional groups in the structure, these moieties may provide vibration absorption in the double frequency area that are significant and can give big influence on material absorption.

Crosslinked poly(meth)acrylate type material showed very good thermal stabilities and no critical deterioration. Sometimes, the second order nonlinear properties were observed more than 3000 hrs even at 100° C. at air. Thus, a combination of poly(meth)acrylate and fluorinated polymer resulted in satisfactory improvement as for optical device material. However, sometimes incorporation of chromophore into fluorinated poly(meth)acrylate resulted in lower thermal stabilities. So, in order to improve the thermally stabilities, a concept of crosslinking seems to be practical method to get higher and better thermally stableness after crosslinking.

In order to get good electrical optical performances, chromophores which are incorporated into matrix host materials are desired to orientate toward the same direction. The chromophore can be orientated to the same direction by poling process or some other proper processes. However, over the time, the direction of chromophore could be disorientated eventually. Particularly, these tendencies are seen in low Tg material case. In order to overcome this disadvantage, the concept of crosslinking is very helpful and practical method to get higher and better thermally stableness.

As typical crosslinking moieties, epoxy/isocyanate moieties and hydroxyl/amino groups are available. However, these kinds of moieties result in existence of NH- or —OH group, which contribute higher absorption in 1.3 to 1.5 µm wavelength region, after crosslinking. On the other hand, as examples of crosslinking moieties which do not result in undesired NH- or —OH group, tri-cyclization of acetylene group, cyanurate ring formation from cyanate ester derivatives, difluoro bismaleimide, or trifluorovinyl groups can be crosslinking moiety candidates. However, from standpoints of crosslinking temperature and easiness of synthesis, trifluorovinyl group seems to be most practical crosslinking moiety, because this group can crosslink around 160-200° C. enough lower than decomposition temperature of thermally unstable other components, such as chromophore.

SUMMARY OF THE INVENTION

Embodiments of the present invention provide a novel polymer and passive and active optical device materials. More particularly, preferred embodiments provide a (meth)acrylate polymer and a composition that provides either passive or active wave-guide optical capabilities. The composition differs from optical device compositions previously known in the art in several points.

An embodiment is a (meth)acrylate polymer and a non-linear optical device material composition comprising the (meth)acrylate polymer, wherein the (meth)acrylate polymer comprises a unit represented by the formula (i):

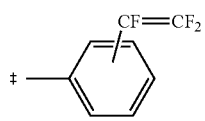

Formula (i)

wherein the symbol "‡" in the chemical structure represents an atom of attachment to another chemical group.

Further, it is preferable that the (meth)acrylate polymer comprises a group represented by the formula (ii):

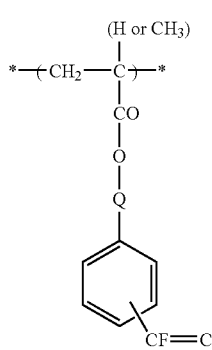

Formula (ii)

wherein Q represents an alkylene group with or without a hetero atom.

Furthermore, a preferable embodiment of the present invention is a (meth)acrylate co-polymer comprising a unit represented by the formula (iii):

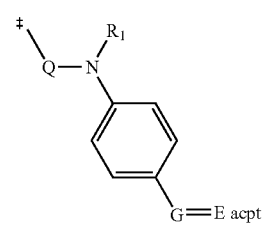

Formula (iii)

wherein Q represents an alkylene group with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; Eacpt is an electron acceptor group; and the symbol "‡" in the chemical structure represents an atom of attachment to another chemical group.

Further, it is preferable that the (meth)acrylate co-polymer comprises a group represented by the formula (iv):

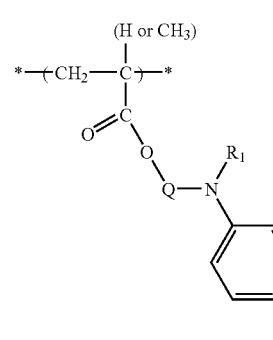

Formula (iv)

wherein Q represents an alkylene group with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

Furthermore, the present invention is a non-linear optical device material composition comprising a (meth)acrylate polymer, wherein the (meth)acrylate polymer comprises a unit represented by the formula (i). It is preferable that the (meth)acrylate polymer comprises a unit or group represented by the formula (ii), (iii) or (iv).

Furthermore, a preferable embodiment of the present invention is a non-linear optical device material composition comprising the above (meth)acrylate polymer and a non-linear optical chromophore.

Furthermore, it is preferable that the non-linear optical chromophore comprises a unit represented by the formula (i).

DETAILED DESCRIPTION OF THE PREFERRED EMBODIMENT

Figure 1:
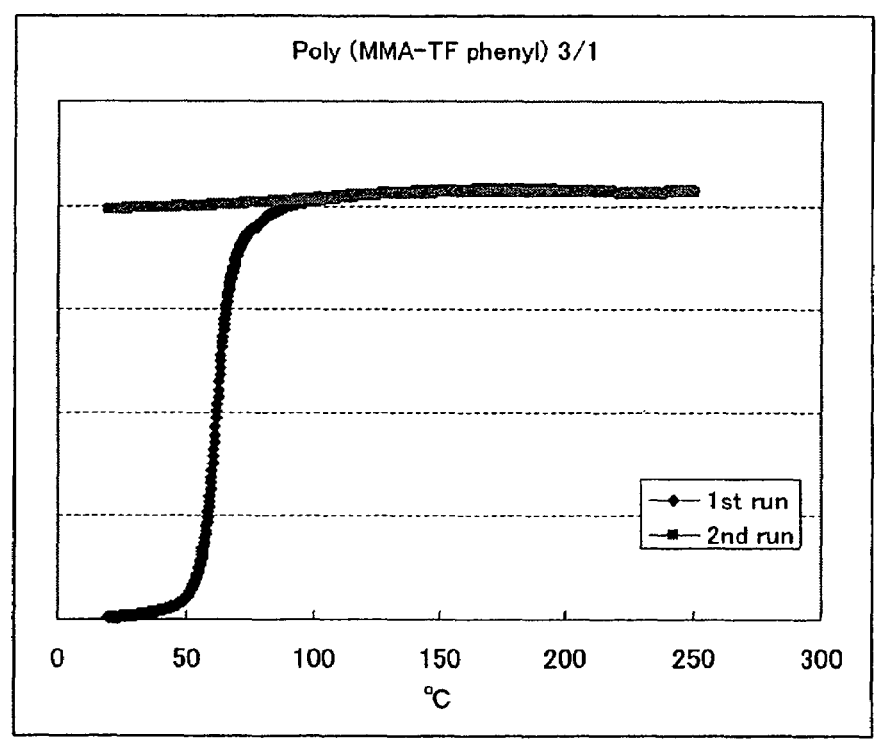
FIG. 1 shows a change of glass transition temperature after heating up and crosslinking.

The invention is a composition for passive and active optical device materials. A preferable embodiment of the composition comprises at least a poly(meth)acrylate matrix that contains trifluorovinyl groups which provides thermally crosslinking ability. Also, a preferable embodiment of the composition comprises a non-linear optics chromophore that provides an active wave-guide ability. Furthermore, the chromophore may contain a trifluorovinyl group which provides thermally crosslinking ability.

A novel trifluorovinyl containing imide derivative, which was reported in a prior art by the inventor (M. Yamamoto, D. C. Swenson and D. J. Burton, Macromol. Symp. Vol. 82, 125-141 (1994)) and can be synthesized by several steps, can form bimolecular cyclic compounds by heating. According to model compound experiment, trifluorovinyl containing imide compounds can convert into two cyclic compounds. Usually, this thermal dimerization reaction can proceed even in presence of air and even corporate in polymer forms.

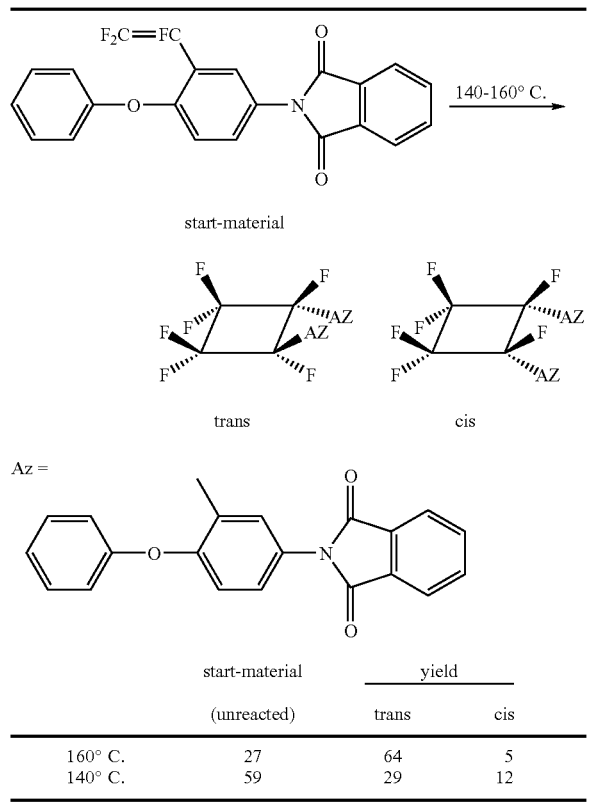

| start-material | yield | |
|---|---|---|
| (unreacted) | trans | cis |
| 27 | 64 | 5 |
| 59 | 29 | 12 |

160° C.
140° C.

This kind of the thermal dimerization behavior is not limited to polyimide structure, but can be applied to any other type of polymer structures. In this invention, the inventor utilized this crosslinking behavior for poly(meth)acrylate which can be used for passive and active optical device materials.

Based on the concept, this trifluorovinyl groups can be incorporated into trifluoro containing poly(meth)acrylate as side-chain, as depicted in the below formula (ii).

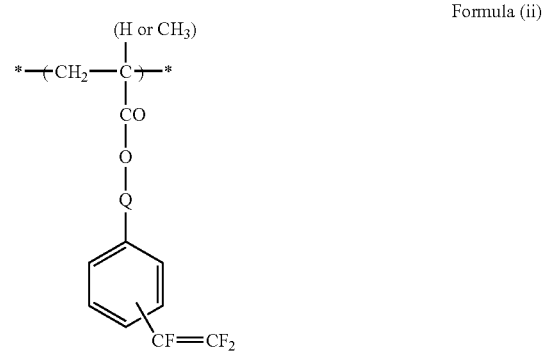

Formula (ii)

wherein Q represents an alkylene group with or without a hetero atom.

The polymer can be thermal curable by two functional group couplings of trifluorovinyl groups and converted into thermal setting polymer. As far as the inventor knows, this kind of trifluorovinyl containing poly(meth)acrylates have not been known, although Alex Jen et al. reported trifluorovinyl ether containing type dendrimer chromophore and utilized for optical device materials.

The proposed trifluorovinyl containing poly(meth)acrylate is expected to have better at least thermal properties, because matrix polymer can be crosslinked and chromophore can be entrapped as an orientation form inside polymer network. Also, at the same time, the poly(meth)acrylate contains relatively large amount of fluorine atom that may lead to low optical loss for IR region signals.

The trifluorovinyl containing poly(meth)acrylate, which is depicted in the above formula (ii), can be prepared from the corresponding (meth)acrylate monomers, which is depicted in the below formula (ii'):

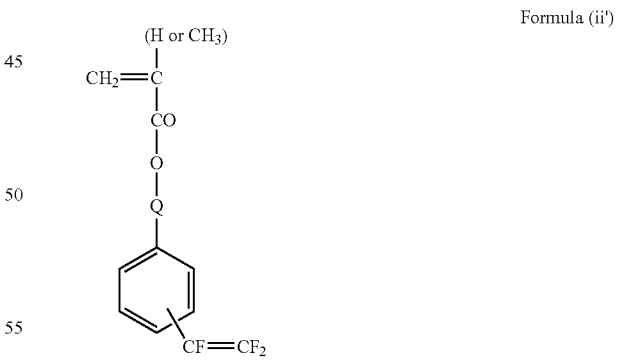

Formula (ii')

wherein Q represents an alkylene group with or without a hetero atom.

A trifluorovinyl group on a benzene ring preferably can be attached from the corresponding iodo-derivative by one-step reaction, as described in the below. Detail of this conversion reaction was reported in the prior art (M. Yamamoto, D. C. Swenson and D. J. Burton, Macromol. Symp. Vol. 82, 125 (1994)).

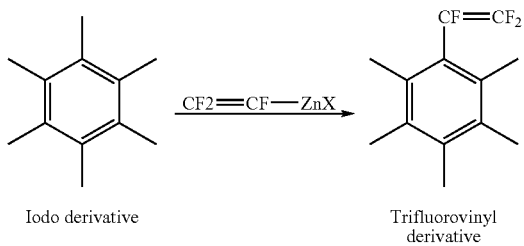

Iodo derivative                Trifluorovinyl derivative

In this step, a trifluorovinyl zinc reagent (chemical formula is depicted as $CF_2=CF-ZnX$) may be used for the above reaction in the presence of a palladium catalysis. As an example of the palladium catalysis, typically $Pd(PPh_3)_4$ can be used. The reaction is preferably carried out at a temperature of from about 80° C. to 120° C., and is allowed to continue for about 1 to 100 hours. Usually, the generally used inactive and dried gas is, preferably, nitrogen, argon, or helium. Reaction pressure is from 1 to 50 atom, preferably from 1 to 5 atom. The addition ratio of zinc reagent is desired to be more than one molar equivalent to the existing iodo precursor. Preferably, ratio of anhydride is from 1 to 3 molar equivalent.

A zinc reagent ($CF_2=CF-ZnX$) preferably can be prepared from trifluoro halide ethane ($CF_2=CF-X$) and zinc in the presence of one or mixture of polar solvents, such as dimethylacetamide, N-methylpyrolidone, DMF, THF, or DMSO. Most preferably DMF can be used and the zinc reagent is a solution form of the above solvents. More detail synthetic procedure is also described in the previous prior art.

The corresponding (meth)acrylate monomer which contains crosslinking ability such as trifluorovinyl can be polymerized by single monomer component. Or other monomer components can be also used for copolymerization. From standpoint of polymer optical transparency, alkyl (meth)acrylates or phenyl group containing (meth)acrylates can be preferably used as components which plays a role of matrix moiety. As an example of alkyl (meth)acrylates, typically methyl (meth)acrylate monomer can be used.

In this copolymerization case, the content of the corresponding trifluorovinyl containing (meth)acrylate monomer and other copolymer monomer is from 1 to 100 weight percent. The higher the ratio of the corresponding trifluorovinyl containing (meth)acrylate monomer is, the resulted polymer become higher glass transition temperature and more brittle polymer property. Thus, preferably, the ratio of the corresponding trifluorovinyl containing (meth)acrylate monomer is desired to be between 10-40 weight percent.

The corresponding trifluorovinyl containing (meth)acrylate monomer can be polymerized by general radical polymerization methods. Diverse polymerization techniques are known in the art. One such conventional technique is radical polymerization, which is typically carried out by using an azo-type initiator, such as AIBN (azoisobutyl nitrile). In this radical polymerization method, the polymerization catalysis is generally used in an amount of from 0.01 to 5 mol %, preferably from 0.1 to 1 mol %, per mole of the sum of the polymerizable monomers.

In the present invention, conventional radical polymerization can be carried out under inactive gas and in the presence of a solvent, such as ethyl acetate, tetrahydrofuran, butyl acetate, toluene or xylene.

Usually, the generally used inactive gas is, preferably, nitrogen, argon, or helium. Polymerization pressure is from 1 to 50 atom, preferably from 1 to 5 atom.

The solvent is generally used in an amount of from 100 to 10000 wt %, preferably from 1000 to 5000 wt %, per weight of the sum of the polymerizable monomers.

The conventional radical polymerization is preferably carried out at a temperature of from about 50° C. to 100° C., and is allowed to continue for about 1 to 100 hours, depending on the desired final molecular weight and polymerization temperature, and taking into account the polymerization rate.

In recent years, a new type of polymerization, termed living radical polymerization, has been developed for polymerization of functional monomers, including methacrylate and styrene derivatives. Living radical polymerization differs from conventional radical polymerization in that the polymer growth terminals can be temporarily protected by protection bonding. This enables polymerization to be well controlled, including being stopped and started at will.

Particularly, this living radical method can polymerize (meth)acrylate moieties without the trifluorovinyl group side reaction, because of mild polymerization condition. Sometimes in case of conventional azo-type initiator radical polymerization, even trifluorovinyl group can be side reacted and resulted in unwanted gelation during (meth)acrylate moiety polymerization. However, this kind of side reaction can be curbed during main frame (meth)acrylate moiety polymerization. Another feature of the living radical polymerization has the potential to form polymers with unusually low polydispersity, such as less than 2.5, such as less than 2.0. Also, particularly living radical polymerization has the capabilities to produce block copolymers, such as A-B type, A-B-A type, or B-A-B type block copolymers, very efficiently.

Details of the living radical polymerization method are described in the literature. They may be found, for example, in the following papers:

T. Patten et al., "Radical polymerization yielding polymers with Mw/Mn ~1.05 by homogeneous atom transfer radical polymerization", *Polymer Preprints,* 1996, 37, 575.

K. Matyjasewski et al., "Controlled/living radical polymerization. Halogen atom transfer radical polymerization promoted by a Cu(I)/Cu(II) redox process", *Macromolecules,* 1995, 28, 7901.

M. Sawamoto et al., "Ruthenium-mediated living radical polymerization of methyl methacrylate", *Macromolecules,* 1996, 29, 1070.

Living radical polymerization is also described at length in U.S. Pat. No. 5,763,548 to Carnegie-Mellon University, which is incorporated herein by reference in its entirety.

As an example of block copolymers prepared by living radical polymerization, novel styrene and butyl acrylate block copolymers for pressure sensitive adhesives have been reported (JP-A 2001-115124, M. Yamamoto et al.). Such block copolymers could not be prepared by conventional polymerization methods.

Briefly, the inventor's living radical polymerization technique involves the use of a polymerization initiator, a catalyst and an activating agent.

The initiator is typically a halogen-containing organic compounds. After polymerization, this initiator or components of the initiator are attached to the polymer at both polymer terminals. The polymerization initiator preferably used is an ester-based or styrene-based derivative containing a halogen in the α-position. Particularly preferred are 2-bromo(or chloro)methylpropionic acid, or bromo(or chloro)-1-phenyl derivatives. Specific examples of these derivatives include ethyl 2-bromo(or chloro)-2-methylpropionate, ethyl 2-bromo(or chloro)propionate, 2-hydroxyethyl 2-bromo(or chloro)-2-methylpropionate, 2-hydroxyethyl 2-bromo(or chloro)propionate, and 1-phenyl ethyl bromide(chloride).

Instead of a mono bromo(chloro) type initiator, a dibromo(chloro) type initiator, such as dibromo(chloro) ester derivative, can be used. Such initiators are represented by the following formula:

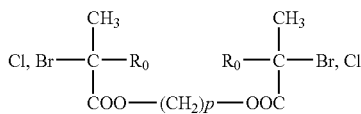

wherein $R_0$ represents a hydrogen atom or methyl group; and p is 2-6.

Of these initiators, most preferred is ethylene bis(2-bromo (chloro)-2-methylpropionate). By using this initiator, the inventor has discovered that block copolymers, and particularly A-B-A type or B-A-B type block copolymers, can be produced very efficiently.

In the inventor's process, the polymerization initiator is generally used in an amount of from 0.01 to 20 mol %, preferably from 0.1 to 10 mol %, and more preferably from 0.2 to 5 mol %, per mole of the sum of the polymerizable monomers.

Various types of catalysts are known, including perfluoroalkyl iodide type, TEMPO (phenylethoxy-tetramethylpiperidine) type, and transition metal type. The inventor has discovered that high-quality polymers can be made by using transition-metal catalysts, which are safer, simpler, and more amenable to industrial-scale operation than TEMPO-type catalysts. Therefore, in the process of the invention a transition-metal catalyst is preferred.

Non-limiting examples of transition metals that may be used include Cu, Ru, Fe, Rh, V, and Ni. Particularly preferred is Cu. Typically, but not necessarily, the transition metal is used in the form of the metal halide (chloride, bromide, etc.).

The transition metal in the form of a halide or the like is generally used in the amount of from 0.01 to 3 moles, and preferably from 0.1 to 1 mole, per mole of polymerization initiator.

The activating agent is an organic ligand of the type known in the art that can be reversibly coordinated with the transition metal as a center to form a complex. The ligand preferably used is a bipyridine derivative, mercaptans derivative, trifluorate derivative, or the like. When complexed with the activating ligand, the transition metal catalyst is rendered soluble in the polymerization solvent. In other words, the activating agent serves as a co-catalyst to activate the catalyst, and start the polymerization.

The ligand is used in an amount of normally from 1 to 5 moles, and preferably from 2 to 3 moles, per mole of transition metal halide.

The use of the polymerization initiator and the activating agent in the above recommended proportions makes it possible to provide good results in terms of the reactivity of the living radical polymerization and the molecular weight and weight distribution of the resulting polymer.

In the present invention, living radical polymerization can be carried out without a solvent or in the presence of a solvent, such as butyl acetate, toluene or xylene.

To initiate the polymerization process, the monomer(s), polymerization initiator, catalyst, activating agent and solvent are introduced into the reaction vessel. As the process starts, the catalyst and polymerization initiator form a radical, which attacks the monomer and starts the polymerization growth.

The living radical polymerization is preferably carried out at a temperature of from about 70° C. to 130° C., and is allowed to continue for about 1 to 100 hours, depending on the desired final molecular weight and polymerization temperature, and taking into account the polymerization rate and deactivation of catalyst.

In the block copolymer preparation by living radical polymerization, the monomer addition sequence is important for achieving the desired copolymer structure. For example, to make random copolymers, both the non-linear optics-group containing and the charge-transfer-group-containing monomers can be added at the same time.

However, by adding the monomers sequentially, block type copolymers can be prepared. For example, to prepare an A-B type block copolymer, wherein polymer block A plays a role of matrix moiety and polymer block B has crosslinking ability such as trifluorovinyl group, firstly the monomer having matrix ability is polymerized, preferably by using a mono bromo(chloro) type initiator. Subsequently, the second monomer having non-linear-optical ability is added to continue the polymerization. In this way, an A-B type block copolymer can be produced. During this polymerization procedure, the second monomer is added at the time when the first monomer is polymerized more than 50% by weight, normally 70% by weight or more, preferably 80% by weight or more, and more preferably 90% by weight or more.

On the other hand, if the monomer having crosslinking ability such as trifluorovinyl group is polymerized first, a B-A type block copolymer can be produced. Similarly to the above polymerization procedure, the second monomer is added at the time when the first monomer is polymerized more than 50% by weight, normally 70% by weight or more, preferably 80% by weight or more, and more preferably 90% by weight or more.

Further, if living radical polymerization is carried out in a manner such that, first, the monomer playing a role for matrix is polymerized, then second, the monomer having crosslinking ability such as trifluorovinyl group is added to continue polymerization, and thirdly an additional amount of the monomer playing a role for matrix is added to continue polymerization, an A-B-A type block copolymer can be produced. During the successive polymerization procedure, the monomer to be subsequently added is added at the time when the conversion of the monomer which has been previously added exceeds at least 50% by weight, normally 60% by weight or more, preferably 80% by weight or more, and more preferably 90% by weight or more.

Moreover, if living radical polymerization is carried out in a manner such that, first, the monomer playing a role for matrix is polymerized (block A), then second, the monomer having crosslinking ability such as trifluorovinyl group is added to continue polymerization (block B), and the thirdly monomer having non-linear-optical ability is added to continue polymerization (block C), an A-B-C type block copolymer can be produced. During the successive polymerization procedure, the monomer to be subsequently added is added at the time when the conversion of the monomer which has been previously added exceeds at least 50% by weight, normally 60% by weight or more, preferably 80% by weight or more, and more preferably 90% by weight or more.

If the copolymer constitutes two or more of polymer blocks A, the A-type constituting blocks need not necessarily be prepared from the same monomer. Likewise, if the copolymer constitutes two or more of polymer blocks B, the B-type blocks need not necessarily be prepared from the same monomer. Likewise, if the copolymer constitutes two or more of polymer blocks C, the C-type blocks need not necessarily be prepared from the same monomer. Thus, the individual blocks may be of different forms represented by A1, A2, A3, etc., B1, B2, B3, and C1, C2, C3 etc. In this way, a large diversity of polymers, such as A1-B-A2, B1-B2-A, A1-B-C, B1-B2-C, or A1-B1-A2-C can be produced.

The composition comprises a copolymer which shows very good phase stability, that is, resistance to phase separation.

Both the random copolymers and the block copolymers disclosed herein provide the advantage of long-term stability, due to lower likelihood of phase separation or crystallization, compared with polymer materials in which the functionality is provided by adding functional materials in the form of dopants.

Physical properties of the formed poly(meth)acrylate that are of importance are the molecular weight and the glass transition temperature, Tg. Also, it is valuable and desirable, although not essential, that the poly(meth)acrylate should be capable of being formed into films, coatings and shaped bodies of various kinds by standard polymer processing techniques, such as solvent coating, injection molding and extrusion before crosslinking.

The poly(meth)acrylate preferably has a weight average molecular weight, Mw, from about 3,000 to 500,000, more preferably from about 5,000 to 100,000. The term "weight average molecular weight" as used herein means the value determined by the GPC (gel permeation chromatography) method in polystyrene standards, as is well known in the art.

For good active waveguide material properties, the photorefractive composition is preferable substantially amorphous and non-crystalline or non-glassy before corona polling. Therefore, it is preferred that the pre-crosslinking composition has a relatively low glass transition temperature, Tg, such as below about 150° C., more preferably below about 100° C. Since crosslinking temperature of a trifluorovinyl group is usually around 140-170° C., Tg of the pre-crosslinking composition is desired to be lower than the crosslinking temperature. In this case, chromophore molecules in the composition can be moved and orientated by choosing right conditions and temperature between the composition Tg and the crosslinking temperature.

Nevertheless, it is preferred that the crosslinked poly(meth)acrylate itself has a relatively high glass transition temperature, by which the inventor means a Tg no lower than about 150° C., because undesired disorientation of chromophores is less likely to occur.

The inventor has developed crosslinkable (meth)acrylate copolymers that comprise a component that provides non-linear optical ability. Since the copolymers have both components of matrix polymer and non-linear optical ability in one polymer chain, it can work as a kind of phase compatibilizer for all components to be mixable without separations. Even if the chromophore material is mixed in the form of dopant, the composition still provides the long-term stability.

In contrast, the inventor's preferred materials, and particularly the (meth)acrylate-based, and more specifically methacrylate-based, polymers, have much better thermal and mechanical properties. That is, they provide better workability during processing by injection-molding or extrusion, for example. This is particularly true when the polymers are prepared by radical polymerization.

Furthermore, in this invention, the matrix poly(meth)acrylate may also include other non-linear optical moiety as desired, as co-polymer components, as described in the formula (iii).

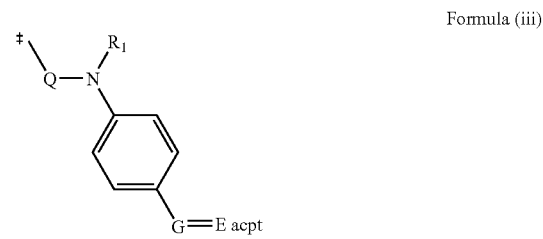

Formula (iii)

wherein Q represents an alkylene group with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; Eacpt is an electron acceptor group; and the symbol "‡" in the chemical structure represents an atom of attachment to another chemical group.

In this case, non-linear optical components may be incorporated as functional groups into the poly(meth)acrylate structure, typically as side groups. This (meth)acrylate copolymer can be prepared from the corresponding (meth)acrylate monomers, which is depicted in the below formula (iv'):

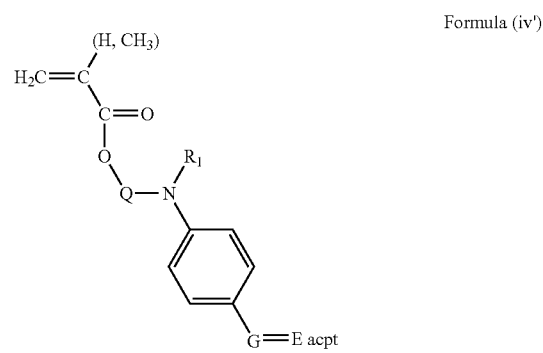

Formula (iv')

wherein Q represents an alkylene group with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

To prepare the non-linear optical containing copolymer, monomers that have side-chain groups possessing non-linear-optical ability are preferably used. Non-limiting examples of monomers that may be used are those containing the following chemical structures:

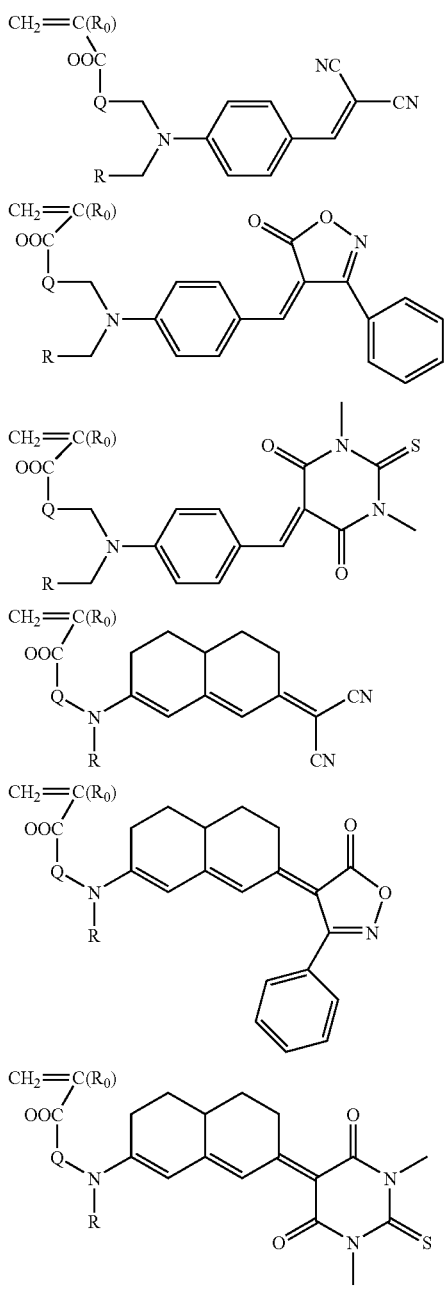

wherein Q represents an alkylene group with or without a hetero atom, such as oxygen or sulfur, and preferably Q is an alkylene group represented by $(CH_2)p$; where p is between about 2 and 6; $R_0$ is a hydrogen atom or methyl group, and R is a linear or branched alkyl group with up to 10 carbons; and preferably R is a alkyl group which is selected from methyl, ethyl, and propyl.

The inventor has discovered a new technique for preparing this invention copolymers. The inventor's technique involves the use of a precursor monomer containing a precursor functional group for non-linear optical ability. Typically, this precursor is represented by the following general formula:

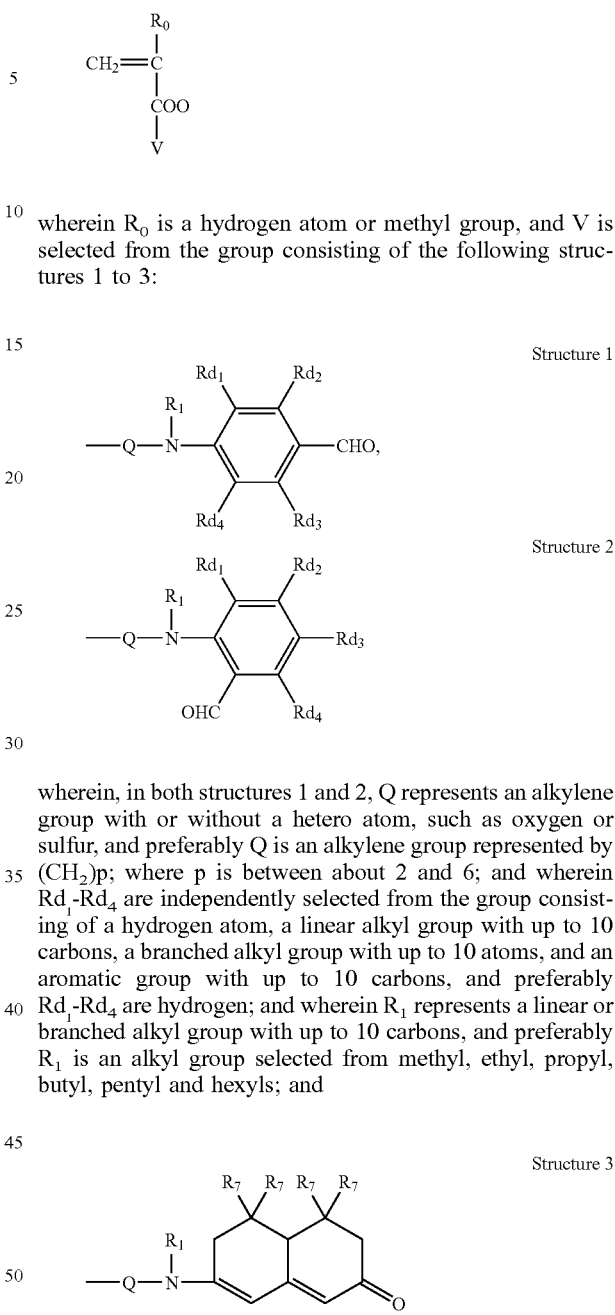

wherein $R_0$ is a hydrogen atom or methyl group, and V is selected from the group consisting of the following structures 1 to 3:

Structure 1

Structure 2 wherein, in both structures 1 and 2, Q represents an alkylene group with or without a hetero atom, such as oxygen or sulfur, and preferably Q is an alkylene group represented by $(CH_2)p$; where p is between about 2 and 6; and wherein $Rd_1$-$Rd_4$ are independently selected from the group consisting of a hydrogen atom, a linear alkyl group with up to 10 carbons, a branched alkyl group with up to 10 atoms, and an aromatic group with up to 10 carbons, and preferably $Rd_1$-$Rd_4$ are hydrogen; and wherein $R_1$ represents a linear or branched alkyl group with up to 10 carbons, and preferably $R_1$ is an alkyl group selected from methyl, ethyl, propyl, butyl, pentyl and hexyls; and Structure 3 wherein Q represents an alkylene group with or without a hetero atom, such as oxygen or sulfur, and preferably Q is an alkylene group represented by $(CH_2)p$; where p is of about 2 to 6; and wherein $R_1$ represents a linear or branched alkyl group with up to 10 carbons, and preferably $R_1$ is an alkyl group selected from methyl, ethyl, propyl, butyl, pentyl and hexyls; and wherein $R_7$ represents a linear or branched alkyl group with up to 10 carbons.

The procedure for performing the radical polymerization in this case involves the use of the same polymerization methods and operating conditions with same preferences, as have already been described above.

After the precursor copolymer has been formed, it can be converted into the corresponding copolymer having nonlinear optical groups and capabilities by a condensation reaction. Typically, the condensation reagent may be selected from the group consisting of:

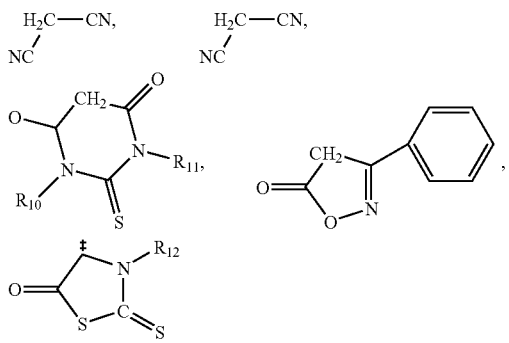

wherein $R_9$, $R_{10}$, $R_{11}$ and $R_{12}$ are independently selected from the group consisting of a hydrogen atom, a linear alkyl group with up to 10 carbons, a branched alkyl group with up to 10 carbons, and an aromatic group with up to 10 carbons.

The condensation reaction can be done at room temperature for 1-100 hrs, in the presence of a pyridine derivative catalyst. A solvent, such as butyl acetate, chloroform, dichloromethylene, toluene or xylene can be used. Optionally, the reaction may be carried out without the catalyst at a solvent reflux temperature of 30° C. or above for about 1 to 100 hours.

The inventor has discovered that use of a monomer containing a precursor group for non-linear-optical ability, and conversion of that group after polymerization tends to result in a polymer product of lower polydispersity than the case if a monomer containing the non-linear-optical group is used. This is, therefore, the inventor's preferred technique.

In this copolymerization case, the content of the corresponding non-linear optical components (meth)acrylate monomer is less than 50 weight percent. The higher the ratio of the non-linear optical (meth)acrylate monomer is, the resulted polymer become higher glass transition temperature and less optical transparency can be observed. Thus, preferably, the ratio of the corresponding non-linear optical components (meth)acrylate monomer is desired to be between 10-30 weight percent. Also, the content of the corresponding trifluorovinyl containing (meth)acrylate monomer is more than 1 weight percent. Preferably, the content is between 10-40 weight percent, from point of good crosslinking performances.

For polymerization, the same technique and methods with already described radical polymerization can be used.

Another embodiment is a composition which comprises a non-linear optic chromophore component. If this composition comprises a non-linear optic chromophore, the composition can be used for an active optical device material, such as a modulator or switching devices.

For good non-linear optical abilities, the composition can be dispersed with a chromophore that possesses non-linear optical properties through the polymer matrix, as is described in U.S. Pat. No. 5,064,264 to IBM, which is incorporated herein by reference. Also, chromophores described in the literature, such as in D. S. Chemla & J. Zyss, "Nonlinear Optical Properties of Organic Molecules and Crystals" (Academic Press, 1987), can be used. Also, as described in U.S. Pat. No. 6,348,992 to Cheng Zhang et. al., sterically stabilized polyene-bridged second-order nonlinear optical chromophores can be used. Or, chromophores described in WO 01/53746 to Pacific Wave Industries Inc., U.S. Pat. No. 6,555,027 to Pacific Wave Industries Inc., US2002/0027220 to Chuanguang Wang, U.S. Pat. No. 6,616,865 to Cheng Zhang, U.S. Pat. No. 6,067,186 to Larry R. Dalton, and U.S. Pat. No. 6,361,717 to Larry R. Dalton can be used.

For typical, non-limiting examples of chromophore additives, the following chemical structure compounds preferably can be used:

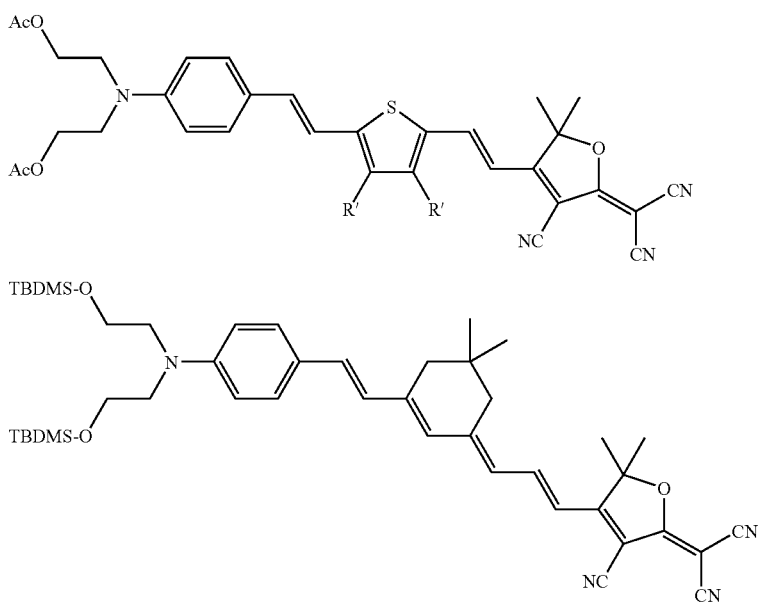

-continued

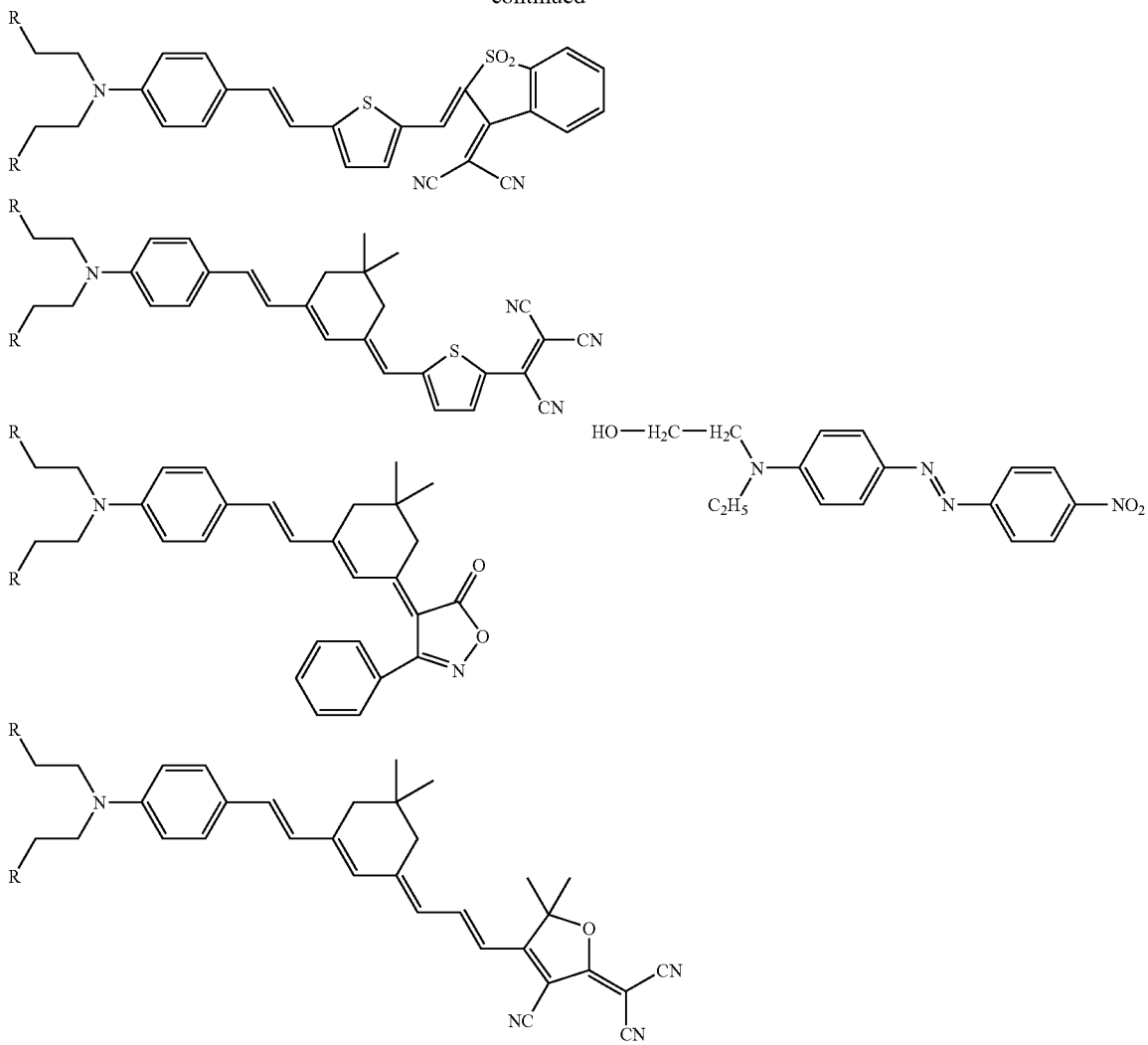

wherein R is independently selected from the group consisting of a hydroxyl, acetoxy, hydrogen atom, a linear alkyl group with up to 10 carbons, and a branched alkyl group with up to 10 atoms.

Beside these typical chromophores, the following chromophore which are described in formula (v) preferably can be used:

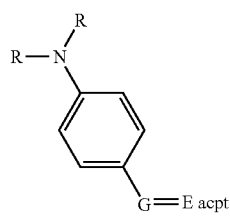

Formula (v)

wherein R is selected from the group consisting of a hydrogen atom, a linear alkyl group with up to 10 carbons, a branched alkyl group with up to 10 carbons, aromatic group with up to 10 carbons, hydroxyl, and acetoxy group; G is a group having a bridge of π-conjugated bond; and Eacpt is an electron acceptor group.

In the above definition, by the term "a bridge of π-conjugated bond", it is meant a molecular fragment that connects two or more chemical groups by π-conjugated bond. A π-conjugated bond contains covalent bonds between atoms that have σ bonds and π bonds formed between two atoms by overlap of their atomic orbitals (s+p hybrid atomic orbitals for σ bonds; p atomic orbitals for π bonds).

By the term "electron acceptor", it is meant a group of atoms with a high electron affinity that can be bonded to a π-conjugated bridge. Exemplary acceptors, in order of increasing strength, are:

As typical exemplary electron acceptor groups, functional groups which are described in prior art U.S. Pat. No. 6,267,913 and shown in the following structure figure can be used. U.S. Pat. No. 6,267,913 is hereby incorporated by reference for the purpose of describing donors and acceptors useful in this invention. The symbol "‡" in a chemical structure herein specifies an atom of attachment to another chemical group and indicates that the structure is missing a hydrogen that would normally be implied by the structure in the absence of the "‡".

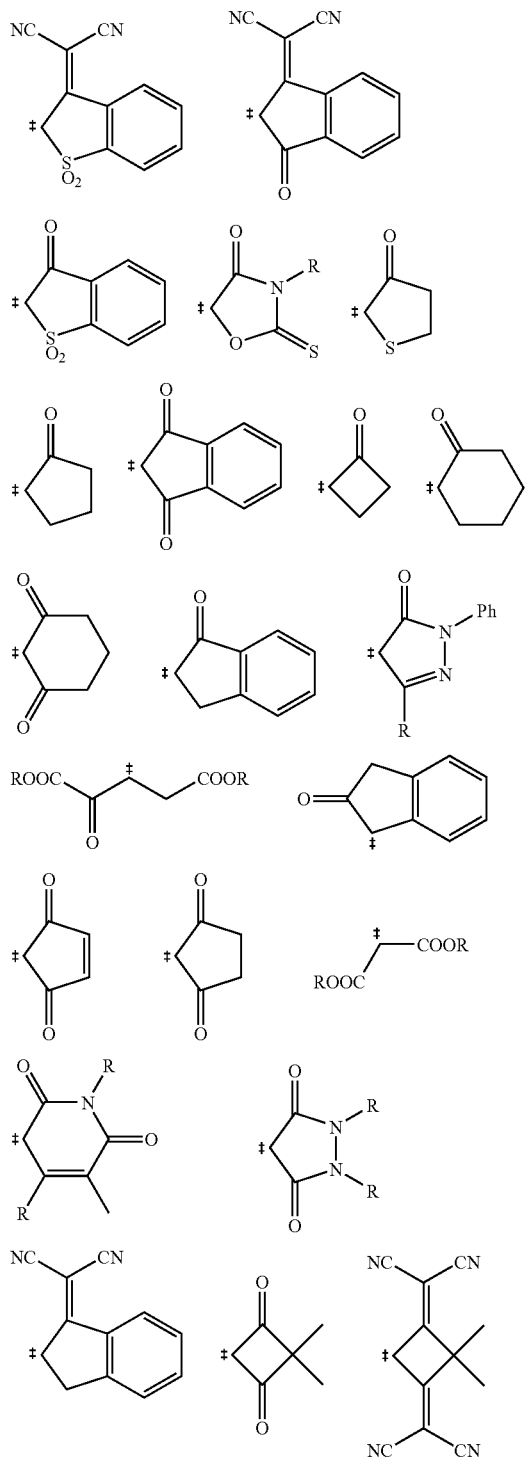

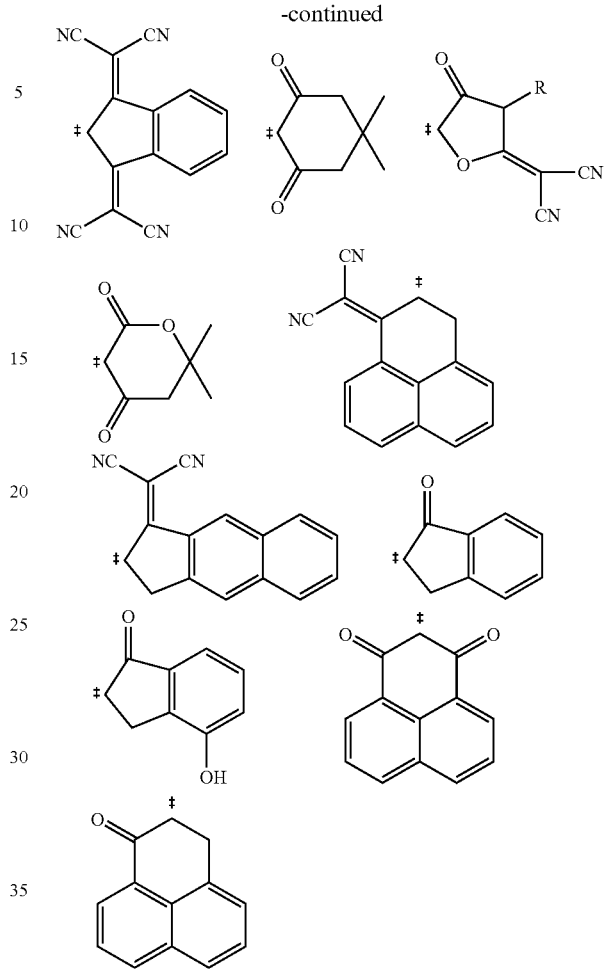

wherein R is selected from the group consisting of a hydrogen atom, a linear alkyl group with up to 10 atoms, a branched alkyl group with up to 10 atoms, and an aromatic group with up to 10 carbons.

The chosen chromophore(s) is mixed in the matrix polymer in a concentration of about preferably up to 50 wt %, more preferably 10-30 wt %.

Another embodiment is a composition which preferably comprises a non-linear optic chromophore that contains a trifluorovinyl unit represented by the formula (i):

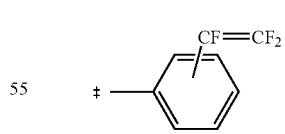

Formula (i)

wherein the symbol "‡" in the chemical structure represents an atom of attachment to another chemical group.

This trifluorovinyl containing moiety can preferably form bimolecular cyclic compounds by heating, as same as this group is incorporated in poly(meth)acrylate matrix side chain. The corresponding thermal dimerization crosslinking reaction can proceed even in the presence of air and even corporate inside of matrix. Also, if this trifluorovinyl groups are incorporated in chromophore moiety too, the chromophore moiety is also crosslinked with a trifluorovinyl containing matrix polymer. As a result, more rigid composition can be obtained than non trifluorovinyl containing chromophore case. Furthermore, original chromophore direction can be fixed and less likely to move around in the matrix. So, if the direction of chromophore is orientated toward one direction by polling process before crosslinking this system, the orientated chromophore direction can be fixed and longer thermal stabilities can be expected.

For typical, non-limiting examples of trifluorovinyl containing non-linear optic chromophores, the following chemical structure compounds preferably can be used:

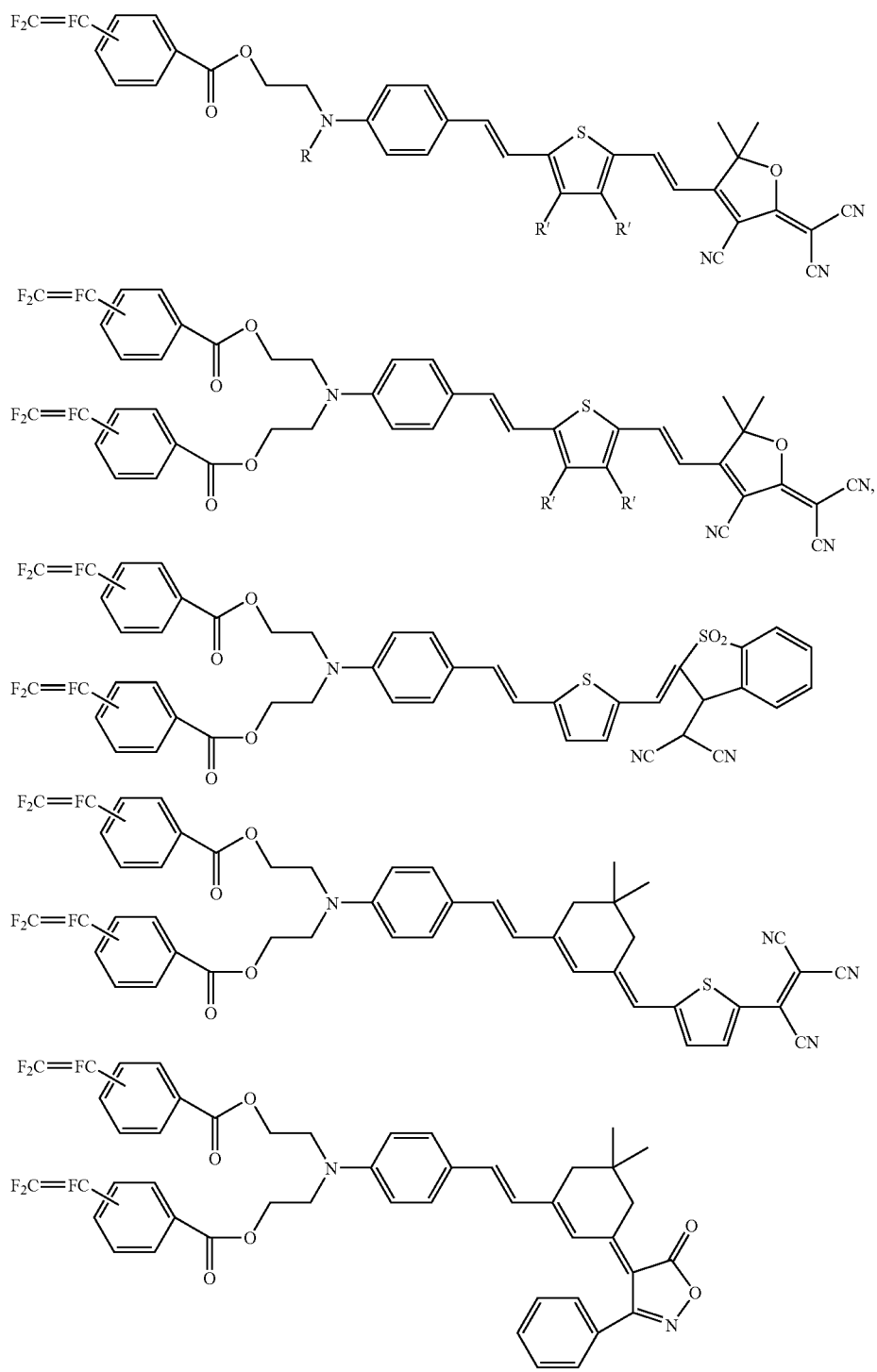

-continued

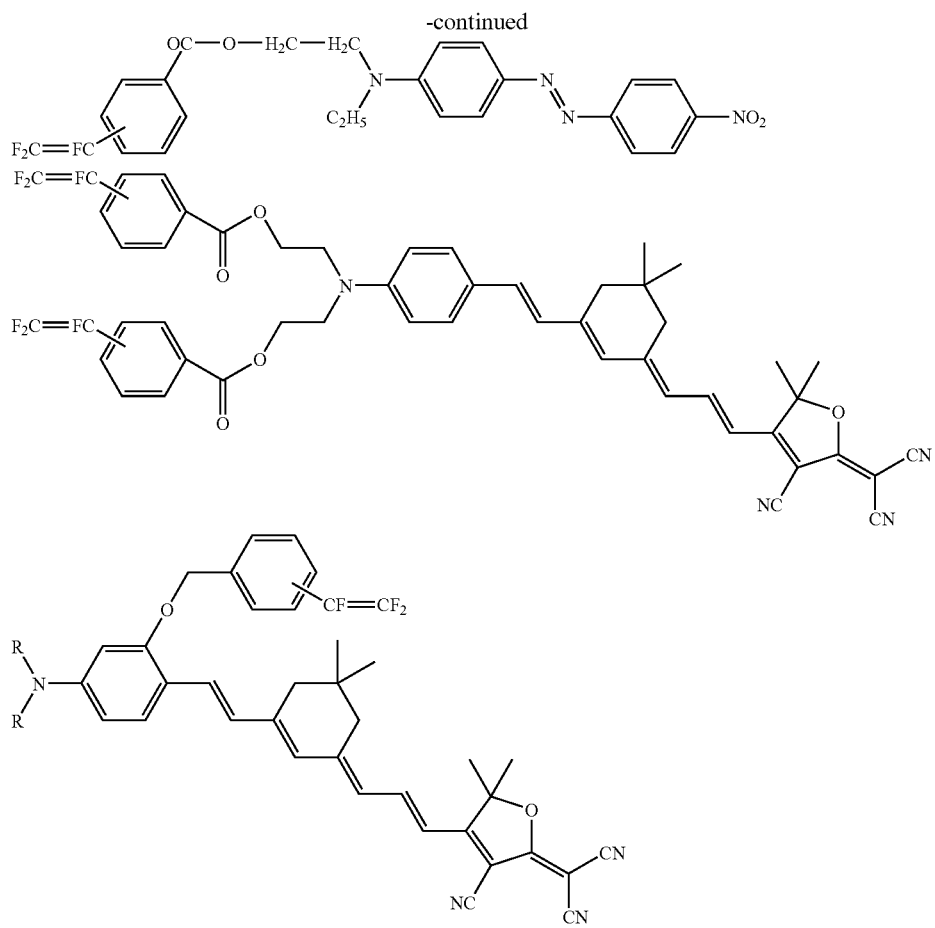

wherein R is independently selected from the group consisting of a hydroxyl, acetoxy, hydrogen atom, a linear alkyl group with up to 10 carbons, and a branched alkyl group with up to 10 atoms.

A trifluorovinyl group on a benzene ring can be attached from the corresponding iodo-derivative by one-step reaction, by the same manner with described in the above.

In this step, a trifluorovinyl zinc reagent is preferably used for the above reaction in the presence of a palladium catalysis. The reaction is preferably carried out at a temperature of from about 80° C. to 120° C., and is allowed to continue for about 1 to 100 hours. Usually, the generally used inactive and dried gas is, preferably, nitrogen, argon, or helium. Reaction pressure is from 1 to 50 atom, preferably from 1 to 5 atom. The addition ratio of the zinc reagent is desired to be more than one molar equivalent to the existing iodo precursor. Preferably, the ratio of anhydride is from 1 to 3 molar equivalent.

A zinc reagent can be prepared from trifluoro halide and zinc in the presence of one or mixture of polar solvents, such as dimethylacetamide, N-methylpyrolidone, DMF, THF, or DMSO. Most preferably DMF can be used and the zinc reagent can be stored stably as a solution form of the above solvents.

A trifluorovinyl group can also be incorporated into the above formula (v) chromophores.

The chosen trifluorovinyl containing chromophore(s) is mixed in the matrix copolymer in a concentration of about preferably up to 50 wt %, more preferably 10-30 wt %.

The measurements and characterizations of the invention material include: refractive index, loss measurement, EO coefficient ($r_{33}$) measurement and processing compatibility.

The goal of compositions is to improve device performance and reduce device cost. The device performance improvements include a) reduce propagation loss; b) improve processability; c) increase electro optical stability. The cost reductions include processing and packaging costs.

Regarding another component of optical device, such as chromophore part, if trifluorovinyl containing chromophore is also used, chromophore moiety can be incorporated into not only matrix polymer and expected better stability. The trifluorovinyl containing matrix polymer and chromophore system can give unique properties and very good thermal properties.

The invention is now further described by the following examples, which are intended to be illustrative of the invention, but are not intended to limit the scope or underlying principles in any way.

EXAMPLES

Key Reagent Preparation

Trifluro Zinc Reagent ($CF_2$=CF—ZnBr)

A two-necked flask equipped with Teflon-coated magnetic stir bar, a dry ice/IPA condenser, and an immersion thermometer was charged with zinc (8.8 g, 138 mol) and 140 mL anhydrous DMF. The contents of the flask were stirred vigorously at room temperature for 20 minutes. Bromotrifluoroethylene (26 g, 0.16 mol) was collected via a dry-ice/ IPA condenser into graduated cylinder and then the condenser attached to the cylinder was quickly replaced by a tee-tube. The other end of the tee tube was connected to the dry ice/IPA condenser over the reaction flask. Bromotrifluoroethylene was slowly warmed and the gas was condensed into reaction flask via a dry ice/IPA condenser. The start of the reaction was indicated by a rise in temperature to 50-70° C. After all the ethylene had been added, the flask was removed at room temperature and put into vacuum to remove unreacted excess ethylene. Then, $CF_2$=CF—ZnBr/ DMF reagent was obtained.

Living Radical Polymerization Initiator Ethylene bis(2-bromo(chloro)-2-methylpropionate) (Br- BMP)

The polymerization initiator ethylene bis(2-bromo (chloro)-2-methylpropionate) (Br- BMP) was synthesized in the following manner. First, anhydrous ethylene glycol (5 g, 81 mmol), triethylamine (17.2 g, 170 mmol), pyridine (1 mL, 12 mmol), and THF (50 mL) were charged into a reaction vessel. To the mixture, 2-bromopropionic acid bromide (42.0 g, 171 mmol) was added, and the reaction vessel was cooled over an ice bath to suppress an exothermic reaction.

The reaction was allowed to run to completion overnight, and the resulting precipitate was removed by filtration. Ethyl acetate (200 mL) and saturated brine (150 mL) were added to the filtrate. The mixture was then allowed to stand for a few minutes. The resulting upper ethyl acetate layer was washed twice with diluted hydrochloric acid and then three times with saturated brine (150 mL), and then dried with anhydrous magnesium sulfate. Magnesium sulfate was removed, and the ethyl acetate was then distilled off under reduced pressure to obtain a crude product.

The crude product thus obtained was purified by silica gel chromatography (developing solvent: 1/1 mixture of ethyl acetate and hexane) to obtain Br- BMP as the desired product. The yield of Br- BMP was 24.2 g (83% by weight).

Other Materials

Besides the above monomers and initiator, other chemicals were purchased from Aldrich Chemicals, Milwaukee, Wis.

Production Example 1 a) Synthetic Method for Trifluorovinyl Containing Methacrylate Monomer (TF-MA)

In order to obtain the polymethacrylate material used in the present invention, the corresponding trifluorovinyl containing methacrylate monomer (TF-MA) was required to be synthesized. By optimizing synthetic studies, the following synthetic pathway seems to be most efficient, as one of synthetic procedures.

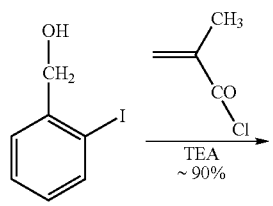

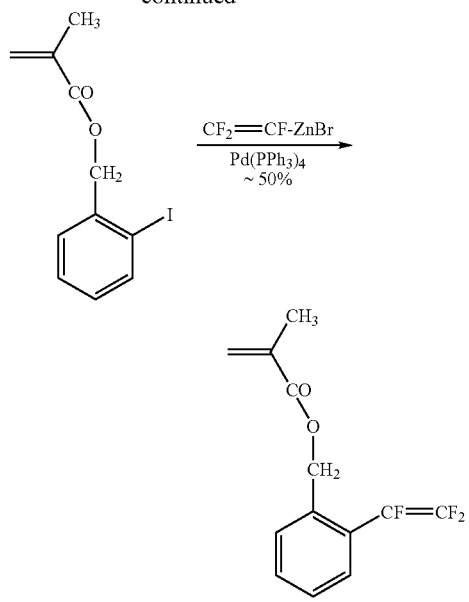

Step 1:

2-iodobenzyl alcohol (5.8 g, 23.3 mmol) was dissolved in dried THD (25 mL). Into this mixture, triethylamine (4.2 mL, 30 mmol) and methacroyl chloride (4.2 mL, 30 mmol) were added dropwisely at same ratio with ice bath cooling. This solution was stirred at 0° C. for 1 hr and further at room temperature for 1 hr. Then, this reaction mixture was pored into sat. NaCl water solution and ether was added and stirred at room temperature for 2 hrs. Ether layer was collected. The ether layer was washed with brine solution and dried over anhydrous magnesium sulfate. After removing the magnesium sulfate, the solvent was removed and the residue was purified by silica gel chromatography (developing solvent: dichloromethane). Powdery compound was obtained. (Yield: g (90%))

Step 2:

Into a two-neck flask equipped with a nitrogen inlet, $Pd(PPh_3)_4$ (2.1 g) and the above iodo derivative (73.0 g, 87.9 mmol) were charged. The previously described $CF_2$=CF—ZnBr in DMF (140 mL) was added and the solution was heated at 85° C. for an overnight. The solution was poured into brine water and resulted slurry compounds were removed by filtration. By ether, the slurry was extracted and rinsed to get target dinitro derivative. The ether layer was dried over anhydrous magnesium sulfate. After removing the magnesium sulfate, the solvent was removed and the residue compound was purified by silica gel chromatography (developing solvent: hexane/dichloromethane=1/1). The obtained target compound yield was 44.8 g (80%).

H-NMR (CDCl$_3$) 7.3 (4H, d, H$_1$), 7.0 (2H, m, H$_2$), 6.9 (4H, d, H$_3$), 6.9 (2H, d, H$_4$), 6.7 (2H, d, H$_5$), 3.7 (3H, bs, H$_6$) (J 1,3=8 Hz, J 4,5=9 Hz),13C NMR (CDCl$_3$): 158.7 (s), 145.0 (s), 143.1 (s), 131.6 (s), 127.2 (s), 125.8 (td), 125.3 (d), 124.4 (q), 123.6 (s), 119.3 (s), 117.0 (s), 114.8 (d), 107.9 (dt), 63.8

Synthetic Method for Copolymer

Production Example 2

Preparation of Copolymer by Azo Initiator Polymerization of Two-components Methacrylate Copolymer

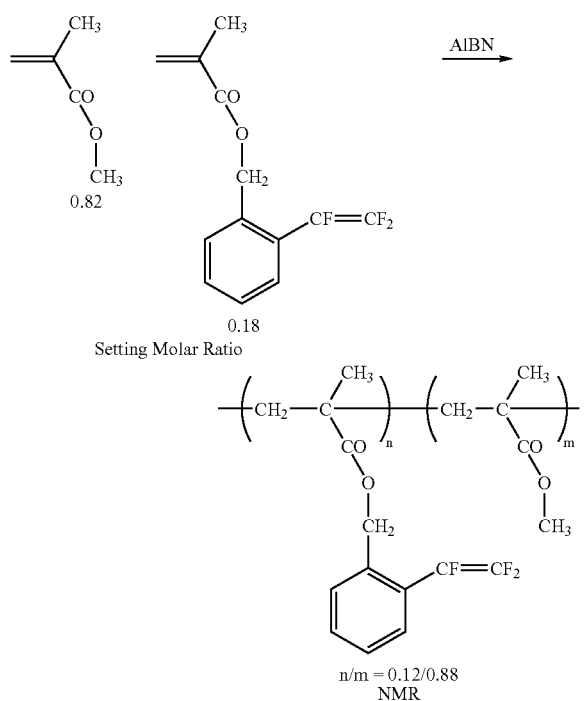

Methyl methacrylate (0.75 g, 2.6 mmol) and obtained trifluorovinyl containing methacrylate monomer (TF-MA) (2.5 g, 4.1 mmol), which was prepared as described in Production Example 1 were put into a three-necked flask. After toluene (9.8 g) was added and purged by argon gas for 1 hour, azoisobutylnitrile (9.4 mg) was added into this solution. Then, the solution was heated to 65 °C., while continuing to purge with argon gas.

After 18 hrs polymerization, the polymerization ratio was checked by H-NMR and found out 70% monomers were consumed. The polymer solution was diluted with toluene. The polymer was precipitated from the solution and added to methanol, then the resulting polymer precipitate was collected and washed in diethyl ether and methanol. The white polymer powder was collected and dried. The yield of polymer was essentially 100%.

As before, the weight average and number average molecular weights were measured by gel permeation chromatography, using a polystyrene standard. The results were Mn=17,462, Mw=34,044, giving a polydispersity of 1.95.

<TMA Analysis>

According to TMA film stretching method, Tg (glass transition temperature) of the film was measured and found out to be 50° C. before crosslinking (1st run), in which film thermal expansion coefficient ratio was dramatically altered. During 2nd run heating, this transition temperature was disappeared and probably became over 220° C. This indicates glass transition temperature was increased after heating up and crosslinking. FIG. 1 shows the result.

Production Example 3

Preparation of Copolymer by Living Radical Initiator Polymerization of Two-components Methacrylate Copolymer A random copolymer having trifluorovinyl containing crosslinkable ability and matrix polymer ability, was prepared.

Into a four-necked flask equipped with a mechanical stirrer, a nitrogen inlet, a condenser, and rubber septum were put methyl methacrylate (0.75 g, 2.6 mmol) and obtained trifluorovinyl containing methacrylate monomer (TF-MA) (2.5 g, 4.1 mmol), which was prepared as described in Production Example 1, bipyridine (110 mg, 0.704 mmol), and toluene (5 mL). After purged with argon gas for 1 hr, Br-BMP (54 mg, 0.15 mmol) dissolved with butyl acetate (1 mL) and CuBr (43 mg, 0.30 mmol) were added into this solution. The solution was then heated to 90° C., while continuing to be purged with argon gas. The polymerization reaction was allowed to proceed, and the resulting polymer solution was diluted with toluene, followed by filtration to remove catalyst-related impurities and polymer precipitation into methanol. The precipitated polymer was collected and washed in methanol. The polymer yield was essentially 100%.

As before, the weight average and number average molecular weights were measured by gel permeation chromatography, using a polystyrene standard. The results were Mn=9,041, Mw=12,434, giving a polydispersity of 1.38.

Production Example 4

Preparation of Copolymer by Azo Initiator Polymerization of Three-components Methacrylate Copolymer (Matrix Methacrylate/Chromophore Type/Crosslinking Trifluorovinyl Monomer)

Methyl methacrylate (0.75 g, 2.6 mmol), obtained trifluorovinyl containing methacrylate monomer (TF-MA) (2.5 g, 4.1 mmol), which was prepared as described in Production Example 1, and 5-[N-ethyl-N-4-formylphenyl]aminopentyl acrylate (precursor monomer for the non-linear-optical component) (0.55 g, 1.90 mmol) were put into a three-necked flask. After toluene (9.8 g) was added and purged by argon gas for 1 hour, azoisobutylnitrile (9.4 mg) was added into this solution. Then, the solution was heated to 65° C., while continuing to purge with argon gas.

After 18 hrs polymerization, the polymerization ratio was checked by H-NMR and found out 70% monomers were consumed. The polymer solution was diluted with toluene. The polymer was precipitated from the solution and added to methanol, then the resulting polymer precipitate was collected and washed in diethyl ether and methanol. The white polymer powder was collected and dried. The yield of polymer was essentially 100%.

As before, the weight average and number average molecular weights were measured by gel permeation chromatography, using a polystyrene standard. The results were Mn=17,462, Mw=34,044, giving a polydispersity of 1.95.

Production Example 5

Synthetic Method for Trifluorovinyl DR-1 Chromophore (TF-DR-1)

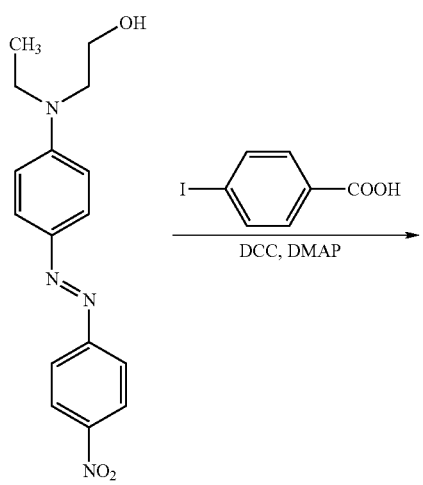

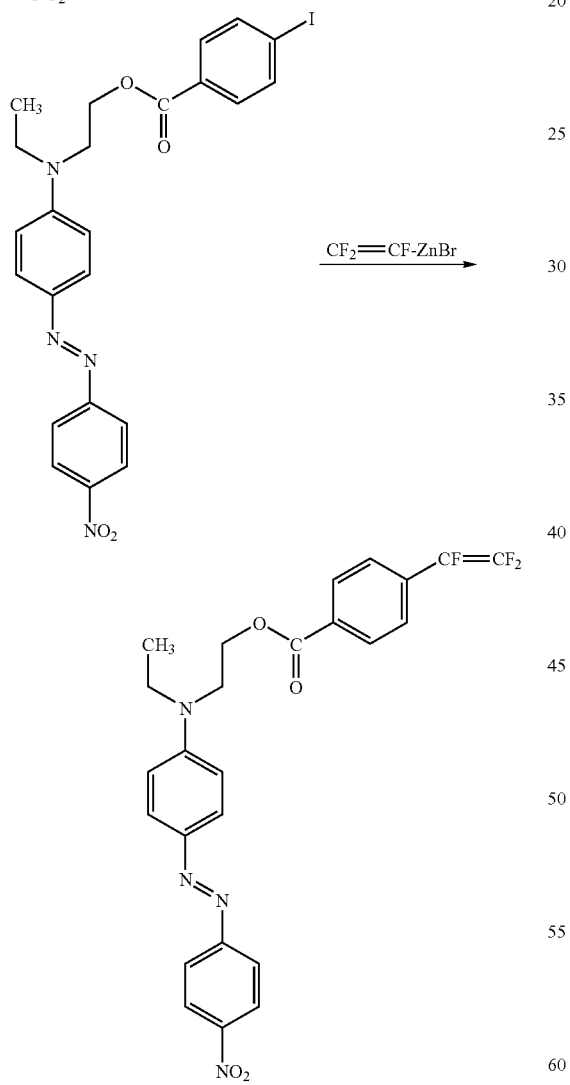

Step 1:

The DR-1 (1.57 g, 5.0 mmol) and 4-iodobenzoic acid (1.24 g, 5.0 mmol) were dissolved with anhydrous THF (20 mL). Into this mixture, dicyclocarbodimide (1.13 g, 5.5 mmol) and 4-dimethylaminopyridine (200 mg, 1.64 mmol) were slowly added with cooling by ice-bath. After stirring for an overnight at room temperature, the reaction mixture was directly purified by silica gel chromatography (developing solvent: hexane/acetone=1/1). The compound yield was 5.38 g (76%), and the compound purity was 99% (by GC).

Step 2:

Into a two-neck flask equipped with a nitrogen inlet, Pd(PPh$_3$)$_4$ (540 mg) and the iodo ester (8.43 g, 15.5 mmol) were charged. CF$_2$=CF—ZnBr in DMF (60 mL, 18 mmol) was added and the solution was heated at 70-80° C. for an overnight. The solution was poured into brine water and extracted by ether. The ether layer was dried over anhydrous magnesium sulfate. After removing the magnesium sulfate, the solvent was removed and the residue acrylate compound was purified by silica gel chromatography (developing solvent: hexane/acetone=1/1). The compound yield was 4.23 g (55%).

Production Example 6

Synthetic Method for Trifluorovinyl FTC Chromophore (TF-FTC)

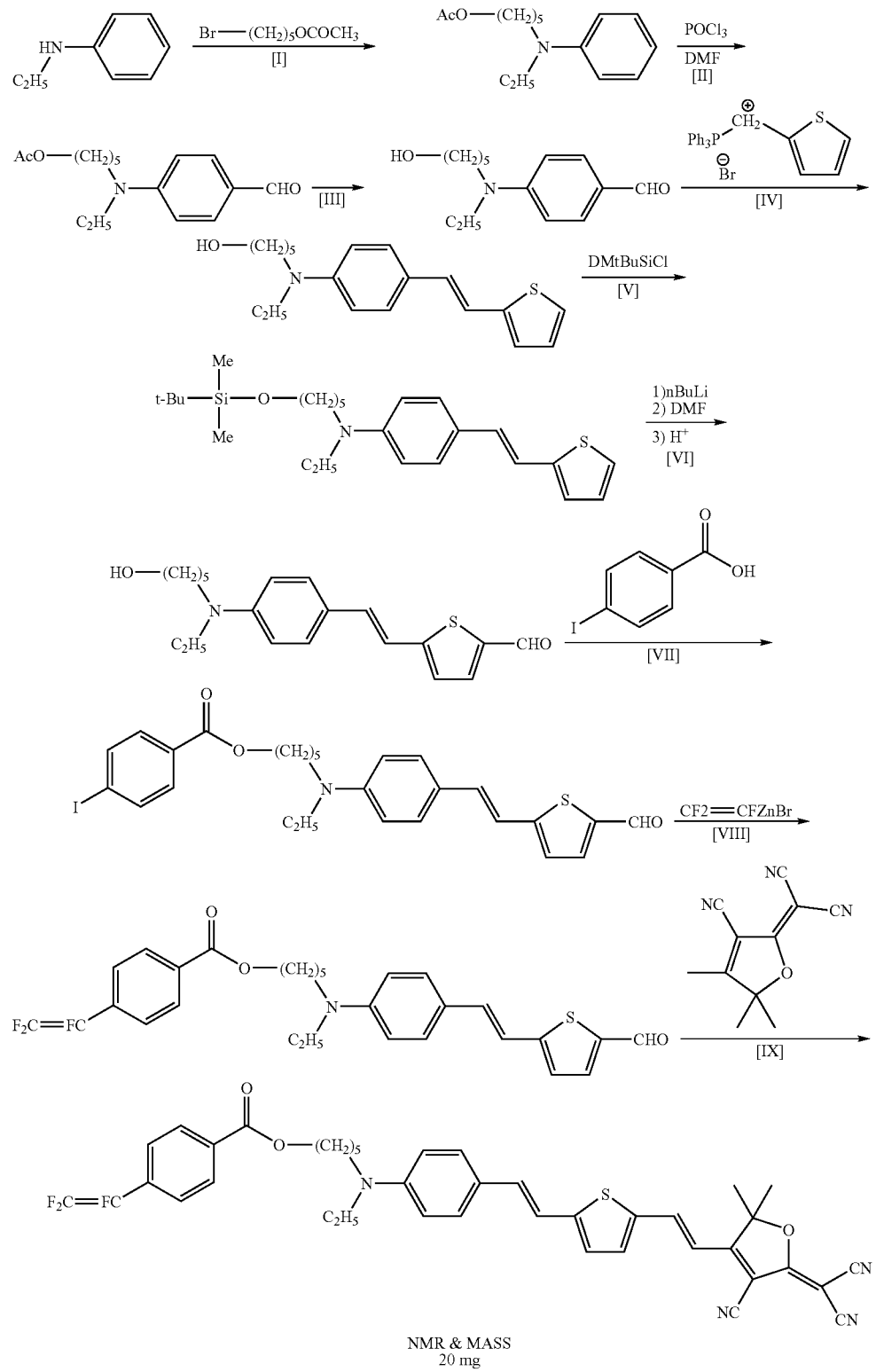
Step 1:
Into bromopentyl acetate (5 mL, 30 mmol) and toluene (25 mL), triethylamine (4.2 mL, 30 mmol) and N-ethylaniline (4 mL, 30 mmol) were added at room temperature. This solution was heated at 120° C. for an overnight. After cooling down, the reaction mixture was rotary-evaporated. The residue was purified by silica gel chromatography (developing solvent: hexane/acetone=9/1). An oily amine compound was obtained. (Yield: 6.0 g (80%))

Step 2:

Anhydrous DMF (6 mL, 77.5 mmol) was cooled in an ice-bath. Then, $POCl_3$ (2.3 mL, 24.5 mmol) was added dropwisely into the 25 mL flask, and the mixture was allowed to come to room temperature. The amine compound (5.8 g, 23.3 mmol) was added through a rubber septum by syringe with dichloroethane. After stirring for 30 min., this reaction mixture was heated to 90° C. and the reaction was allowed to proceed overnight under an argon atmosphere.

The next day, the reaction mixture was cooled, and poured into water and extracted by ether. The ether layer was washed with potassium carbonate solution and dried over anhydrous magnesium sulfate. After removing the magnesium sulfate, the solvent was removed and the residue was purified by silica gel chromatography (developing solvent: hexane/ethyl acetate=3/1). An aldehyde compound was obtained. (Yield: 4.2 g (65%))

Step 3:

The aldehyde compound (3.92 g, 14.1 mmol) was dissolved with methanol (20 mL). Into this mixture, potassium carbonate (400 mg) and water (1 mL) were added at room temperature and the solution was stirred overnight. The next day, the solution was poured into brine water and extracted by ether. The ether layer was dried over anhydrous magnesium sulfate. After removing the magnesium sulfate, the solvent was removed and the residue was purified by silica gel chromatography (developing solvent: hexane/acetone=1/1). An aldehyde alcohol compound was obtained. (Yield: 3.2 g (96%))

Step 4:

The starting aldehyde alcohol (5 g, 21.2 mmol) was dissolved in 56 mL of absolute ethanol along with the thiophene salt (2.15 g, 21.2 mmol). To this solution was added, dropwise, a 0.85 M solution of sodium ethoxide (2.15 g of NaOEt dissolved in 37 mL ethanol). After addition, put the mix into 80° C. bath. The clear yellow solution was rotovaped after 5 hours. The mix was purified by silica gel chromatography (using 1 Hex: 1 Eth Aoc) as eluent. The product was an yellow oil. The yield was 77%.

Step 5:

The starting alkene (4 g, 12.7 mmol) was dissolved in 50 mL of dry DMF. The reaction mixture was cooled with an ice bath. Added the silane reagent (2.3 g, 15.2 mmol) and imidazole (2.1 g, 30.8 mmol) let stir at room temperature for 20 min. The reaction mix was extracted with water and pentane after which the organic layer was rotovaped. Got a yellow oil. Yield was 100%.

Step 6:

The starting silyl protected alkene (5 g, 11.6 mmol) was dissolved under Argon in −78° C. cooled 50 mL dry THF (dried over Na/Benzophenone). Dropwise, added 14.6 mL of 1.6M "BuLi (23.4 mmol). The dark blue solution was warmed to 0° C. after which 4.2 mL of dry DMF was added. The red solution was stirred at room temperature for one hour. The solution was rotovaped and extracted with ethyl acetate and water (saturated with sodium bicarbonate). The organic layer was purified by silica gel chromatography (7 DCM: 3 Acetone as eluent). The product was a red liquid. The yield was 93%.

The aldehyde (4 g, 8.7 mmol) product was dissolved in 28.7 mL of THF and a mix of $HCl/H_2O$ (8 mL of 12.1M HCl in 39.84 mL of $H_2O$) was added. Let stir in 42° C. bath for five hours after which the THF was rotovaped. The solution was neutralized with 5M aqueous ammonia solution and extracted with DCM. The product was purified by silica gel chromatography (7 Eth Aoc: 3 Hex). Product was a red liquid. The yield was 87%.

Step 7:

The aldehyde alcohol (2 g, 5.8 mmol) was dissolved in 35 mL of THF. Added iodobenzoic acid (1.44 g, 5.8 mmol) and DCC (1.2 g, 5.8 mmol) and DMAP (0.21 g, 1.7 mmol). Let stir at room temperature overnight after which the product was purified by silica gel chromatography (7 Eth Aoc: 3 Hex and then with 7 Hex: 3 Eth Aoc). The product was a red viscous liquid. The yield was 100%.

Step 8:

The starting aldehyde (3.51 g, 6.1 mmol) was dissolved in 37 mL of DMF. Added 12.2 mL of 1M solution of the $CF_2$=CF—ZnBr reagent. Also added $Pd(PPh_3)_4$ (189.7 mg, 0.16 mmol) and put in a 75° C. bath and let go overnight. After cooling, the mix was extracted with ether and ethyl acetate, respectively. The residue was purified by silica gel chromatography (just DCM and then 7 Hex: 3 Eth Aoc). The product was a red solid. The yield was 100%.

Step 9:

The trifluoro aldehyde (3.89 g, 7.4 mmol) was dissolved in 43 mL of chloroform. Added the tricyano furan (1.76 g, 8.8 mmol) and TEA (195 mL, 1.4 mmol). Let stir under Ar in a 61° C. bath. After stirring for 6½ hours, the product was purified by silica gel chromatography (1 Hex: 1 Ace2 O and then 1 Hex: 1 Eth Aoc in a very long column). The product was a dark green solid. Yield was 24%. The starting material in this reaction can be recovered and the reaction restarted if more product is desired.

Example 1

An EO modulator_composition sample was prepared. The components of the composition were as follows:

| | | |
|---|---|---|
| (i) | MMA/TF-MA type methacrylate copolymer (described in Production Example 2): | 80 wt % |
| (ii) | Prepared chromophore powder of TF-DR-1 (Production Example 5): | 20 wt % |
| | Preparation of non-linear optical testing samples | |
| | The procedure of testing film sample fabrication is described as follows: | |
| i) | The matrix polymer and the chromophore were mixed by the described. | |
| ii) | DMAc-THF(1/1) solvents were added to make 10 wt/vol % solution. | |
| iii) | The solution was stirred for a certain time period (usually for 4-6 hours at least). Then, filter it by using 0.2 μm PTFE filter disk. | |
| iv) | Spin-coating: 430 rpm for 9 sec on substrates (glass, quartz, or ITO coated glass). | |
| v) | Removing solvent: 70° C. for 2 minutes and under vacuum and dry environment. Post-treatment: 50° C. for 16 hours under vacuum environment. | |

By using the above method, testing samples on a substrate of glass or quartz were prepared. The film thickness of the samples were determined by surface profile measuring machine (manufactured by Dektak Co. LTD). Thickness of the sample was 2.2 μm.

Measurement 1

The material characterizations include: refractive index measurement, loss measurement, poling processing, EO coefficient ($r_{33}$) measurement and processing compatibility, etc.

Refractive Index Measurements

The waveguide sample of the prepared thin films (2.2 μm thickness on glass substrate) supported two modes (both TE and TM) at 1.31 μm, respectively. The results were 1.565 (TE mode) and 1.558 (TM mode).

Loss Measurements

Figure 2:
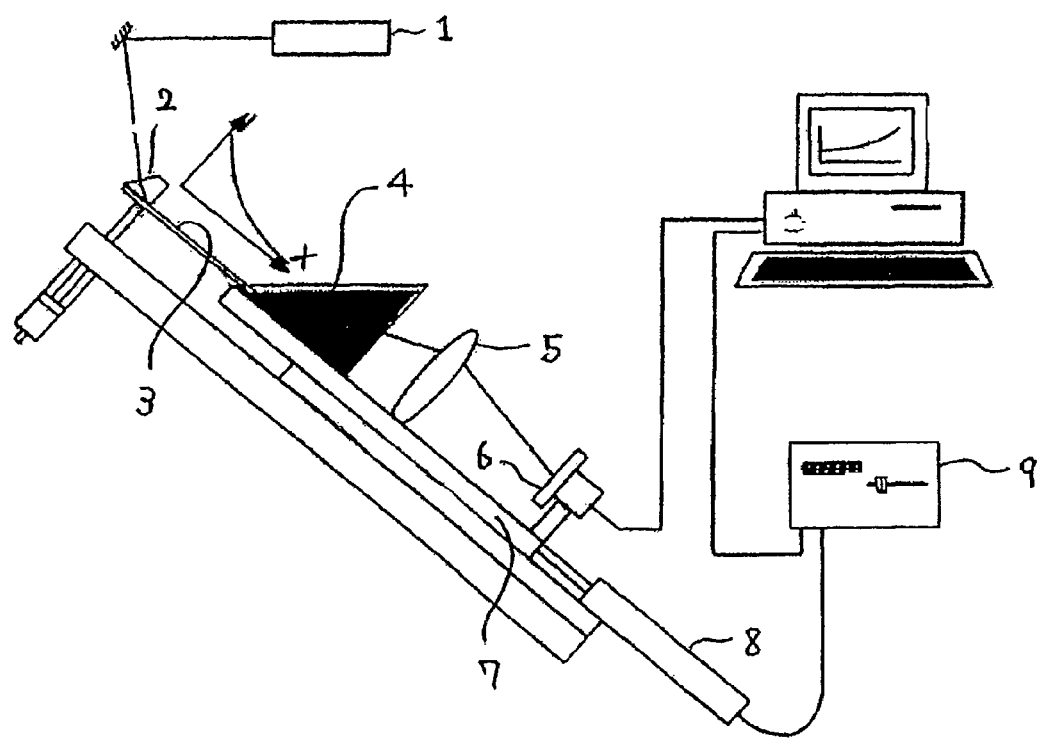
FIG. 2 is a view showing Experimental Setup for waveguide loss measurement.

Insertion losses in polymers including absorption and scattering losses are due to material properties, namely interband electronic absorption of the chromophore and C—H vibration absorption of chromophore and polymer host. The scattering loss is mainly attributed to dust particles and microdomains introduced during the processing (spin coating, poling, photolithographic processing, and etc.). There have been several techniques to measure insertion loss in polymer materials. The nondestructive and immersion method developed by Teng is relatively convenient and precision technique commonly used for loss measurements of polymer waveguide devices, and the setup is shown in FIG. 2. Experimental Setup for waveguide loss measurement as shown in FIG. 2 is constituted of laser 1, prism 2, waveguide 3, glass container with index matching liquid 4, lens 5, detector 6, translation stage 7, actuator 8, and actuator controller 9. A setup for loss measurement together with computer-controlling software is schematically shown in Figure. Intensity of laser signal was measured by changing distance of the waveguide. Based on slope rate of the data, a propagation loss can be calculated.

The propagation loss measurement result of the Example 1 sample was ~0.06 dB/cm at 1.31 μm under TM mode using prism coupling technique.

EO Coefficient r33 Measurements

By using the grating method, r33 value of the sample was measured. As a result, the Example 1 sample case was 4.4 pm/V.

Example 2

An EO modulator_composition sample was prepared. The components of the composition were as follows:

| | |
|---|---|
| (i) MMA/TF-MA type methacrylate copolymer (described in Production Example 2): | 80 wt % |
| (ii) Prepared chromophore powder of CLD-75 (described in the below figure) | 20 wt % |

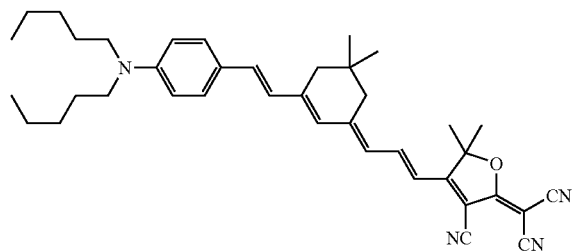

(CLD-75)

EO Coefficient r33 Measurements

By using the same grating method, r33 value of the sample was measured. As a result, the Example 2 sample case was 70 pm/V.

Example 3

An EO modulator composition sample was prepared. The components of the composition were as follows:

| | |
|---|---|
| (i) MMA/TF-MA type methacrylate copolymer (described in Production Example 3): | 80 wt % |
| (ii) Prepared chromophore powder of TF-DR-1 (Production Example 5) | 20 wt % |

Example 4

An EO modulator composition sample was prepared. The components of the composition were as follows:

| | |
|---|---|
| (i) Three-component (MMA/chromophore Type/TF-MA) type methacrylate copolymer (described in Production Example 4): | 80 wt % |
| (ii) Prepared chromophore of TF-FTC (Production Example 6) | 20 wt % |

Example 5

An EO modulator composition sample was prepared. The components of were as follows:

| | |
|---|---|
| (i) Three-component (MMA/chromophore Type/TF-MA) type methacrylate copolymer (described in Production Example 4): | 80 wt % |
| (ii) Prepared chromophore of DR-1 (supplied from Aldrich) | 20 wt % |

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An acrylate or methacrylate polymer comprising a unit represented by the following structure:

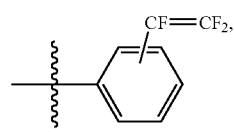

wherein the structure is attached to the acrylate or methacrylate polymer.

2. The acrylate or methacrylate polymer of claim 1, which comprises a group represented by the formula (ii):

Formula (ii)

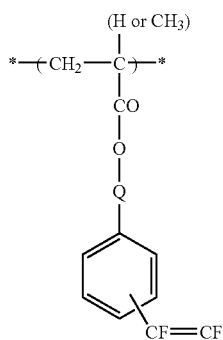

wherein Q represents an alkylene group with or without a hetero atom.

3. An acrylate or methacrylate polymer comprising a first unit represented by the following structure:

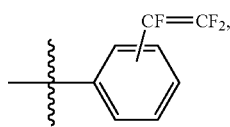

wherein the first unit is attached to the acrylate or methacrylate polymer, and further comprising a second unit represented by the following structure:

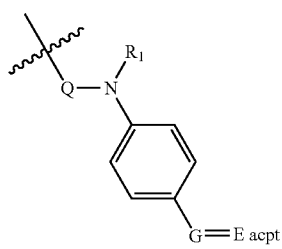

wherein Q represents an alkylene group with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; Eacpt is an electron acceptor group; and the second unit is attached to the acrylate or methacrylate polymer.

4. The acrylate or methacrylate polymer of claim 3, which comprises a group represented by the formula (iv):

Formula (iv)

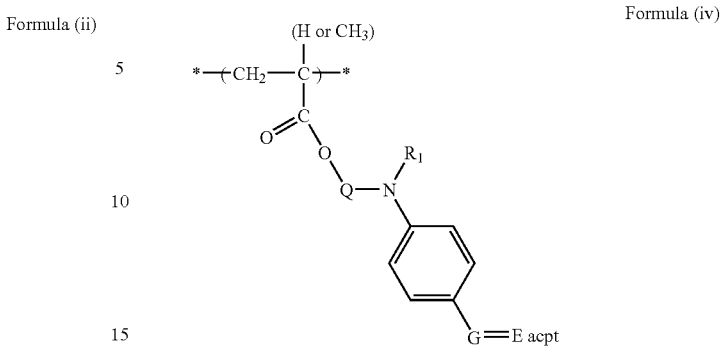

wherein Q represents an alkylene group with or without a hetero atom; $R_1$ is selected from the group consisting of a hydrogen atom, a linear alkyl group with up to 10 carbons, a branched alkyl group with up to 10 carbons, and an aromatic group with up to 10 carbons; G is a group having a bridge of π-conjugated bond; and Eacpt is an electron acceptor group.

5. A non-linear optical device material composition comprising the acrylate or methacrylate polymer of claim 1.

6. A non-linear optical device material composition comprising the acrylate or methacrylate polymer of claim 2.

7. A non-linear optical device material composition comprising the acrylate or methacrylate polymer of claim 3.

8. A non-linear optical device material composition comprising the acrylate or methacrylate polymer of claim 4.

9. The composition of claim 5, further comprising a non-linear optical chromophore.

10. The composition of claim 6, further comprising a non-linear optical chromophore.

11. The composition of claim 7, further comprising a non-linear optical chromophore.

12. The composition of claim 8, further comprising a non-linear optical chromophore.

13. The composition of claim 9, wherein the non-linear optical chromophore comprises a unit represented by the following structure:

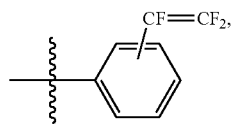

wherein the structure is attached to the acrylate or methacrylate polymer.

14. The composition of claim 10, wherein the non-linear optical chromophore comprises a unit represented by the following structure:

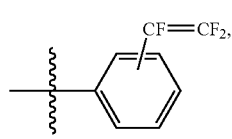

wherein the structure is attached to the acrylate or methacrylate polymer.

15. The composition of claim 11, wherein the non-linear optical chromophore comprises a unit represented by the following structure:

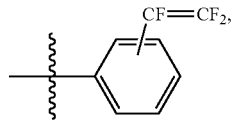

wherein the structure is attached to the acrylate or methacrylate polymer.

16. The composition of claim 12, wherein the non-linear optical chromophore comprises a unit represented by the following structure:

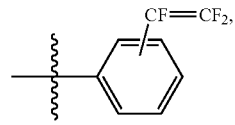

wherein the structure is attached to the acrylate or methacrylate polymer.

* * * * *